United States Patent [19]
Sankaran et al.

[11] Patent Number: 5,832,484
[45] Date of Patent: Nov. 3, 1998

US005832484A

[54] DATABASE SYSTEM WITH METHODS FOR PARALLEL LOCK MANAGEMENT

[75] Inventors: Mohan Sankaran, Alameda; Vaikom Bala Krishnan, Fremont, both of Calif.

[73] Assignee: Sybase, Inc., Emeryville, Calif.

[21] Appl. No.: 673,893

[22] Filed: Jul. 2, 1996

[51] Int. Cl.$^6$ .................................................. G06F 17/00
[52] U.S. Cl. ............................. 707/8; 707/9; 395/673; 395/677
[58] Field of Search ..................... 707/1–206; 364/134, 364/228–246; 395/406, 670–678, 680–688

[56] References Cited

U.S. PATENT DOCUMENTS

| | | | |
|---|---|---|---|
| 4,606,002 | 8/1986 | Waismann et al. | 364/200 |
| 4,677,550 | 6/1987 | Ferguson | 364/300 |
| 4,791,561 | 12/1988 | Huber | 364/300 |
| 4,805,099 | 2/1989 | Huber | 364/200 |
| 4,947,320 | 8/1990 | Crus et al. | 364/200 |
| 5,089,952 | 2/1992 | Bozman | 395/725 |
| 5,123,104 | 6/1992 | Levine et al. | 395/600 |
| 5,163,148 | 11/1992 | Walls | 392/600 |
| 5,197,702 | 3/1993 | Spix et al. | 395/650 |
| 5,204,958 | 4/1993 | Cheng et al. | 395/600 |
| 5,247,684 | 9/1993 | Tavares et al. | 395/700 |
| 5,265,224 | 11/1993 | Ghosh et al. | 395/600 |
| 5,274,809 | 12/1993 | Iwasaki et al. | 395/650 |
| 5,295,262 | 3/1994 | Seigh, II | 395/600 |
| 5,307,487 | 4/1994 | Tavares et al. | 395/650 |
| 5,428,761 | 6/1995 | Herlihy et al. | 395/425 |
| 5,430,869 | 7/1995 | Ishak et al. | 395/600 |
| 5,502,840 | 3/1996 | Barton | 395/726 |
| 5,515,538 | 5/1996 | Kleiman | 395/733 |
| 5,553,267 | 9/1996 | Herlihy | 395/474 |

OTHER PUBLICATIONS

Comer, D., "*The Ubiquitous B–Tree,*" Computing Surveys, Jun. 1979, pp. 121–137.

Stevens, A., "Hypertree: *A Hypertext Index Technique,*" Dr. Dobb's Journal, Jun. 1990, pp. 135–136, 138–140, 154, 156–159.

Baker, M., "*B–tree indexing, A look at indexing tradeoffs in dBASE, Clipper, and FoxPro,*" Programmer's Journal, Nov./Dec. 1990, pp. 42–46.

Ferguson, D., "*Bit–Tree,*" Communications of the ACM, Jun. 1992, pp. 115–120.

Williams, W., "*Supercharging Sequential Searches, Speed plus compression equals faster searches,*" Dr. Dobb's Journal, Dec. 1990, pp. 54–61.

*Primary Examiner*—Wayne Amsbury
*Assistant Examiner*—David Yiuk Jung
*Attorney, Agent, or Firm*—John A. Smart

[57] ABSTRACT

Database system and methods are described for improving scalability of multi-user database systems by improving management of locks used in the system. The system provides multiple server engines, with each engine having a Parallel Lock Manager. More particularly, the Lock Manager decomposes the single spin lock traditionally employed to protect shared, global Lock Manager structures into multiple spin locks, each protecting individual hash buckets or groups of hash buckets which index into particular members of those structures. In this manner, contention for shared, global Lock Manager data structures is reduced, thereby improving the system's scalability. Further, improved "deadlock" searching methodology is provided. Specifically, the system provides a "deferred" mode of deadlock detection. Here, a task simply goes to sleep on a lock; it does not initiate a deadlock search. At a later point in time, the task is awakened to carry out the deadlock search. Often, however, a task can be awakened with the requested lock being granted. In this manner, the "deferred" mode of deadlock detection allows the system to avoid deadlock detection for locks which are soon granted.

30 Claims, 15 Drawing Sheets

SHARED LOCKS
FOLLOWED BY
MULTIPLE
EXCLUSIVE LOCKS

ADDING A NEW
SHARED LOCK

T1: TASK 1
T2: TASK 2

601

DATABASE SYSTEM WITH METHODS FOR PARALLEL LOCK MANAGEMENT

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to mechanisms for controlling allocation of locks on information stored in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server) acting as a DBMS. Commercial examples of these "client/server" systems include Powersoft™ clients connected to one or more Sybase SQL Server™ database servers. Both Powersoft™ and Sybase SQL Server™ are available from Sybase, Inc. of Emeryville, Calif.

As the migration to client/server continues, each day more and more businesses are run from mission-critical systems which store information on server-based SQL database systems, such as Sybase SQL Server™. As a result, increasingly higher demands are being placed on server-based SQL database systems. Accordingly, there is much interest in improving the performance of such systems, particularly in terms of execution speed and reliability.

One area where system performance sometimes has been found to be lacking is the server functionality responsible for coordinating access of multiple clients to shared database objects, specifically the aspect of "locking" database objects. Locking mechanisms are employed on DBMSs to prevent multiple tasks from concurrently sharing a resource (e.g., reading or writing a database record) in a manner which leads to inconsistency of the resource. Common concurrency problems include lost updates, uncommitted dependencies, and inconsistent analyses. These problems and some locking mechanisms designed to address them are described in the general database literature; see, e.g., Nath, A., *The Guide to SQL Server*, Second Edition, Addison-Wesley Publishing Company, 1995, which is hereby incorporated by reference for all purposes.

Briefly, certain tasks require "exclusive" access, while other tasks need only "shared" access. When a client accesses a database record for the purpose of updating that record, the client must take out an exclusive "lock" on that record to ensure that while the task is using the record, another task cannot concurrently modify (and in some cases also not read) the record. For example, if a first user updates a data record to reflect a recent transaction, a lock on that record assures the user that no other users can concurrently modify the record while his or her transaction is being processed.

In one approach to lock management, such as found in Sybase SQL Server™ (System 10), different locks are provided in shared memory and are made available by a global resource manager commonly referred to as a lock manager. When a task requires access to a record, the lock manager determines whether an appropriate lock can be granted, and, if so, allocates such a lock to the task. If the lock manager finds an existing lock on the record, it either queues a request for the lock or grants a concurrent lock to the task, depending upon the nature of the existing lock and the type of access required (i.e., whether the locks can co-exist).

Access to the lock manager in such a system is limited by a single spin lock on the lock manager itself. This spin lock must be taken by any task requiring access to the lock manager for the purpose of obtaining a lock on a database record or for any other purpose. This approach prevents other tasks from simultaneously accessing any other locks through the lock manager. On the one hand, providing a single spin lock for the lock manager simplifies system design: lock-related procedures such as deadlock detection can be conducted easily. On the other hand, the single spin lock also becomes a bottleneck to providing scalability, that is, providing additional server engines on the same network. Specifically, the single spin lock approach hampers system scalability, since any additional engine provided must contend for the same single spin lock.

One approach to solving this problem might be to provide multiple instances of the lock manager itself. Such a solution quickly leads to communications problems, however. For example, each request for a new lock would require that the multiple instances of the lock manager communicate the request among themselves to ensure that the requested lock is actually available (i.e., does not conflict with other granted locks). Further, deadlock detection becomes quite complicated: deadlock searches would now have to be conducted over the multiple lock managers, each of which could deallocate or allocate locks while another lock manager is being searched.

Thus, what is needed is an improved database system with methods for allocating locks that allows system throughput to scale with the number of database engines on a network, while not requiring an unduly complicated communications protocol.

SUMMARY OF THE INVENTION

The present invention comprises a Client/Server Database System with methods for providing parallel lock management. In an exemplary embodiment, the system includes one or more Clients (e.g., Terminals or PCs) connected via a Network to a Server. The Server, operating under a server operating system (e.g., Windows NT) includes a Database Server System, such as Sybase SQL Server™. Clients, operating under client applications, store data in and retrieve data from one or more database tables resident on the Server by submitting SQL commands, some of which specify "queries"—criteria for selecting particular records of a table.

Operation of a client application requires access to various objects in the system, such as a database table, a data page, an index page, a memory buffer, or the like. Specifically, the Access Methods within the server employ various Resource Governors which controls allocation of such Server resources as buffer caches, locks, and the like. For these functions, the Resource Governors employ separate managers such as a buffer manager for controlling the contents of buffer caches employed by the server to buffer database records.

One such resource governor or manager is a Parallel Lock Manager (hereinafter, simply "Lock Manager") of the present invention. It provides lock management for the Resource Governors' internal clients (e.g., Access Methods) —controlling all client locking. The Lock Manager allocates locks, deallocates/releases locks, searches for deadlocks, and the like. The Lock Manager manages different lock types, each one for controlling access to a different type of system resource. Exemplary lock types include address locks, table locks, pages locks, and semaphore locks. Here, an address lock locks a memory address—a buffer. The semaphore locks control access to a system log table(s) so that tasks can make log entries as necessary. Thus, when a task is ready to log its transaction, it first takes out a semaphore lock. Both address and semaphore locks are system internal locks (i.e., not typically visible to user applications). The table locks control access to tables within the database, and page locks control access to individual pages (e.g., index pages and data record pages) stored in the database. Both the page locks and table locks are user visible locks. Each may be processed indirectly (e.g., through SQL statements) by a user application. Although there are different lock types, the Lock Manager largely views the different lock types generically—applying the same or similar management methodology to each type.

The Lock Manager provides an internal application programming interface ("API") to its internal clients, such as the Access Methods. Because the Lock Manager is a global resource, identical copies are provided in each engine of a database network (as identical pieces of server code). In particular, an SMP (symmetric multi-processor) embodiment of the Database Server System supports multiple database engines (i.e., multiple instances of the engine), up to an arbitrary number of database engines. Each engine includes a Lock Manager instance. Even though there are multiple instances of the Lock Manager, the engines share a single, global set of data structures.

Conventionally, such structures were protected by a single spin lock. Such an approach robs a system's ability to scale in an SMP environment, due to contention among the multiple server engines for the single spin lock. To reduce this contention for these shared data structures, therefore, the present invention provides the Lock Manager (of each engine) with methods for parallel lock management— decomposing the (prior) single spin lock into multiple spin locks, each protecting individual hash buckets or groups of hash buckets.

Decomposing the (prior) spin lock into multiple spin locks greatly reduces contention for the Lock Manager's data structures and thereby improves the system's scalability. At the same time, however, existing lock management methodology, such as conventional "deadlock" searching, depended on the simplicity of a single spin lock for protecting these interdependent structures—that is, that Lock Manager's data structures were all frozen by a single spin lock (i.e., would not be changed by another task). Accordingly, implementation of parallel lock management requires improved "deadlock" searching methodology.

Access to particular lock types is controlled via hash tables, one table for each lock type. Each hash table has one or more spin locks, each spin lock for controlling a subset or range of one or more hash buckets for the table. In this manner, contention is substantially reduced: locks only block when two tasks each concurrently require access to hash buckets covered by the same spin lock. In previous systems, in contrast, a single spin lock was always used to protect such structures and, thus, always presented a bottleneck.

By associating groups of hash buckets with a particular spin lock, spin locks in the system of the present invention are conserved. The number of spin locks employed for each hash table is user (administrator) configurable. The simplest use is to configure the system such that the minimum number of spin locks is employed: one spin lock for each hash table. Even at this minimum, contention is reduced: processing a lock request of one type of lock (e.g., page lock) will not block access to other types of locks (e.g., address locks). At the other extreme, the user can allocate one spin lock for each and every bucket (up to the number of spin locks available in the system). Here, increasing the number of spin locks increases parallelism available with a give lock type—contention for other hash buckets within a given table decreases as the number of spin locks assigned to that table increases. In typical use, the user will configure or tune use of available spin locks to optimize system performance. In this manner, contention for access to the Lock Manager can be reduced while preserving efficient use of system spin locks, thereby allowing the system to appropriately scale up as more engines are added to the system.

Decomposing the (prior) spin lock into multiple spin locks greatly reduces contention for the Lock Manager's data structures and thereby improves the system's scalability. At the same time, however, existing lock management methodology, such as conventional "deadlock" searching, depended on the simplicity of a single spin lock for protecting these interdependent structures—that is, that Lock Manager's data structures were all frozen by a single spin lock (i.e., would not be changed by another task). Accordingly, implementation of parallel lock management requires improved "deadlock" searching methodology.

"Deadlock" is a well-known scenario when two or more tasks go to sleep waiting (directly or indirectly) for each other to release their respective locks on resources that they are accessing. To detect a deadlock, a database system performs a deadlock search for examining sleeping tasks to identify any "cycles," i.e., a dependency chain which points back to the sleeping task that initiated the search. The presence of such a cycle indicates a deadlock. When one is identified, the server chooses a "deadlock victim" from among the tasks making up the cycle to break the deadlock.

To avoid deadlocks, a system must be able to detect deadlocks among sleeping tasks. Conventionally, each task undertakes deadlock searching immediately after it begins waiting on a lock request. A common approach is to employ a depth-first search of the dependency graph (a tree data structure), looking for cycles. If a cycle is found, the deadlock can be broken by selecting a deadlock victim. In many instances, however, a task's requested lock is immediately or quickly granted, therefore rendering deadlock searching moot. In many cases, therefore, immediate deadlock searching incurs unnecessary overhead and, thus, hurts system performance.

To address this inefficiency, the system of the present invention provides "deferred" deadlock detection. Here, a task simply goes to sleep on a lock; it does not initiate a deadlock search. Routinely, the task will be awakened with the lock being granted. If a deadlock is present, however, the task will not be awakened with a granted lock. To address this second case, the system provides a deferred mode of deadlock detection. For this mode, the system provides a user-configurable, periodic alarm. The user configures the alarm for delaying or "deferring" deadlock detection up to a certain time period. In a preferred embodiment, the delay is set to a default time period of 100 milliseconds. Setting the time period to 0 milliseconds indicates that deadlock detection is not deferred.

As before, a task using deferred mode continues to initiates the deadlock searching. However, "when" the task actually initiates deadlock searching changes. If the time period for the alarm is greater than zero, the task will not initiate the search at the time of sleeping on the lock. Instead, a periodic alarm handler will increment a counter until the specified time period is reached. The alarm handler works in conjunction with an "engine scheduler" to make sure that, if a task sleeps on an lock request for more than the configured time period, the task is awakened. This time, however, the task is awakened to initiate deadlock searching. More specifically, the alarm handler checks a "lock sleeptask queue" (described below) to see if there is a sleeping task that has waited for at least the "deadlock checking period." If such a task is found, the task is awakened so that it can perform its own deadlock search. In a preferred embodiment, only a single deadlock search may be conducted at any given time. Therefore, a semaphore (rdlc_status) is employed to control the process. If a deadlock search is being conducted by a first task, a second task may have to wait longer than the "deadlock checking period" period before initiating its own deadlock search.

DESCRIPTION OF THE PREFERRED EMBODIMENTS

Figure 1A:
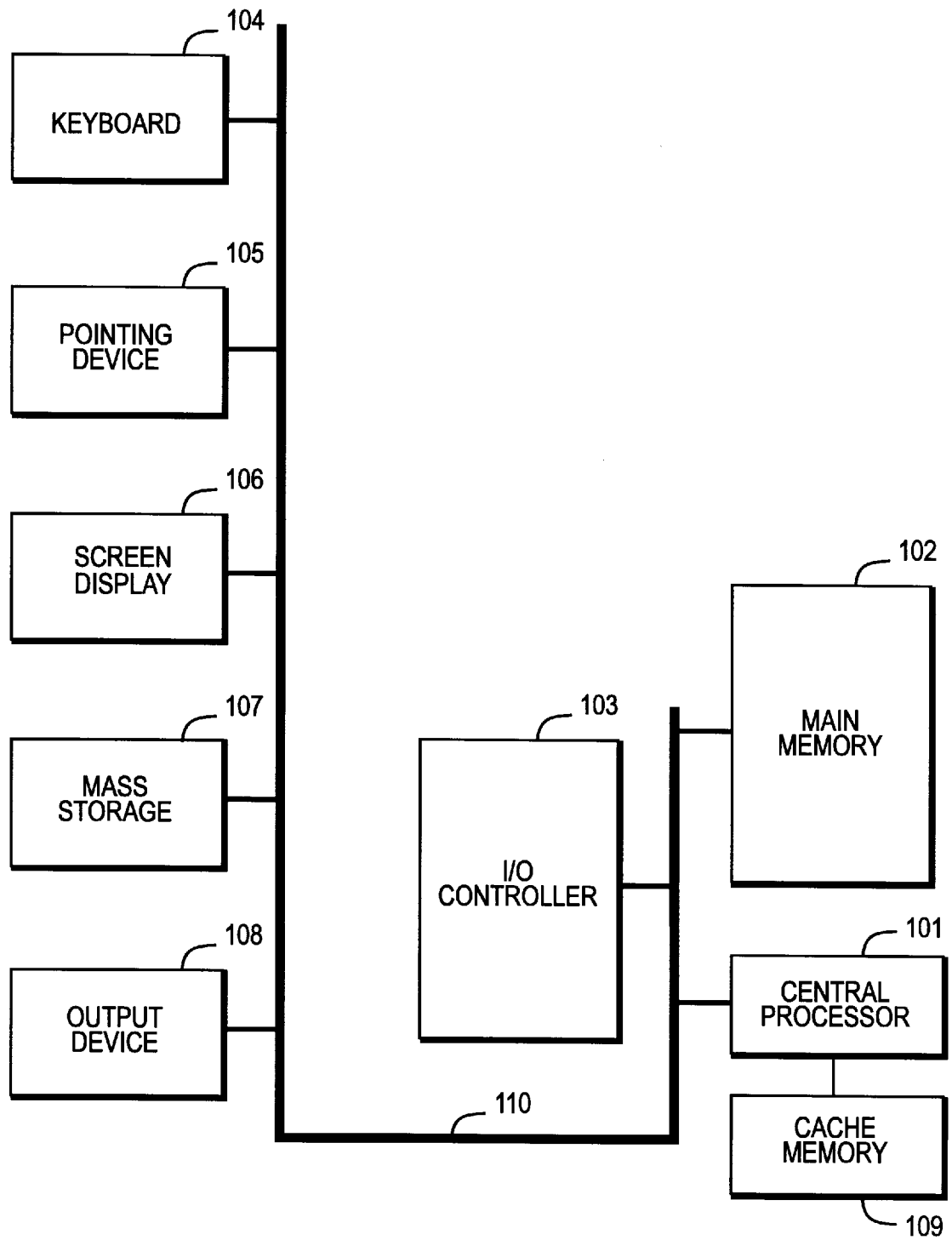
FIG. 1A is a block diagram illustrating a computer system in which the present invention may be embodied.

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where contention for resources occurs and some locking mechanism is employed, including non-SQL database management systems and the like. The description of the exemplary embodiments which follows is, therefore, for the purpose of illustration and not limitation.

Definitions

At the outset, it is helpful to briefly review database terms which will be used in the subsequent discussion of the construction and operation of the system and methods of the present invention. The definitions are provided to assist in understanding the preferred embodiments described herein.

A "database object" is an article stored in one or more databases. Examples of such database objects include tables, tuples, logs for databases, statistics pages, views, stored procedures, and the like. Such database objects may have attributes such as sizes, names, types, and so forth. In addition, a database object is a "resource" employed by the database during normal functioning. Examples of such resource-type database objects include buffers and semaphores. In the context of this invention, locks can be placed on some or all of these database object types.

A "semaphore" is an indicator, such as a flag, used to govern access to shared system resources, for maintaining order among processes that are competing for use of resources.

A "task" is a program in execution together with virtual memory containing instructions, data, and context information, such as descriptors for open files and communication channels. In the context of this invention, tasks and processes will be used interchangeably, although conventionally "process" may refer to only the program in the execution component of a task.

A "lock manager" is any database entity or collection of entities that control access to locks on database objects. Typically, tasks requesting locks on particular database objects lodge their requests with a lock manager.

A "hash table" is a look-up table associated with particular objects in a collection of resources such as individual locks accessible through a lock manager. It provides pointers to the various objects currently provided. The location of a pointer within the hash table is a function of certain attributes of the object (i.e., "hash function") associated with the pointer. When access to a particular object is required, the system indexes into the appropriate entry in the hash table for determining whether the object is available and takes action accordingly.

"Hash buckets" are provided for holding information about the objects indexed in a hash table. If there are more objects than hash buckets, then the additional objects can be "chained off" at least some hash buckets. This may be desirable when a relatively large number of locks are provided by the system.

Transactional locks, or simply "locks," are employed by the system to coordinate OLTP (on-line transactional processing). Typical transactional locks include, for instance, a table lock and a page lock. These locks can be shared or exclusive. An "exclusive" lock, when held by a given process, completely excludes all other processes from accessing the locked object. A "non-exclusive" or "shared" lock, on the other hand, permits certain types of shared access while the lock is held by a given process. For example, if a first process takes out a non-exclusive lock on a data page, a second process may be permitted to read data records from that page even while the first process holds the lock. However, the non-exclusive lock might prevent the second process from writing to any data records contained in the locked data page.

In contrast to transactional locks, "spin" locks operate at a lower level (i.e., at the operating system level) to control system-critical resources. These locks are characterized by the fact that a task will continue to "spin"—that is, continues to execute—if a resource is not immediately available (i.e., if the lock is not immediately granted). Ordinarily, when a task requests a lock, such as a transactional lock, the requesting task will "sleep" on the lock if it is not immediately available (e.g., the lock is currently held by another task). When "sleeping," the task is in effect placed in a suspended state until some point in time when it is "awakened." For instance, a task sleeping on a lock will be awakened when the underlying database management system is ready to grant the lock (and, accordingly, grant access to the desired data structure). When a task is put to "sleep," the underlying system switches tasks, from the now sleeping one to one which is awake. In this manner, processor resources can be conserved: a sleeping task consumes no processor resources while sleeping.

A task or context switch itself is not cost-free: system resources are required for swapping out the context of one task for another. For instance, the then-current state of the task to be put to sleep must be stored, while the system switches to another task. Once the task is awakened, the system must restore the state information for the awaking task. For certain system critical resources, the overhead incurred with such a task switch is unacceptable. By spinning instead of sleeping, a task can avoid the overhead and cost of a context switch. To ensure that waiting tasks do not spin too long, spin locks typically contain only very few instructions, so that they are held for only a very short duration. Spin locks are employed within the system of the present invention to control access to low-level system resources, such as important lock management data structures which are shared.

Standalone System Hardware

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk (e.g., "floppy"), optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
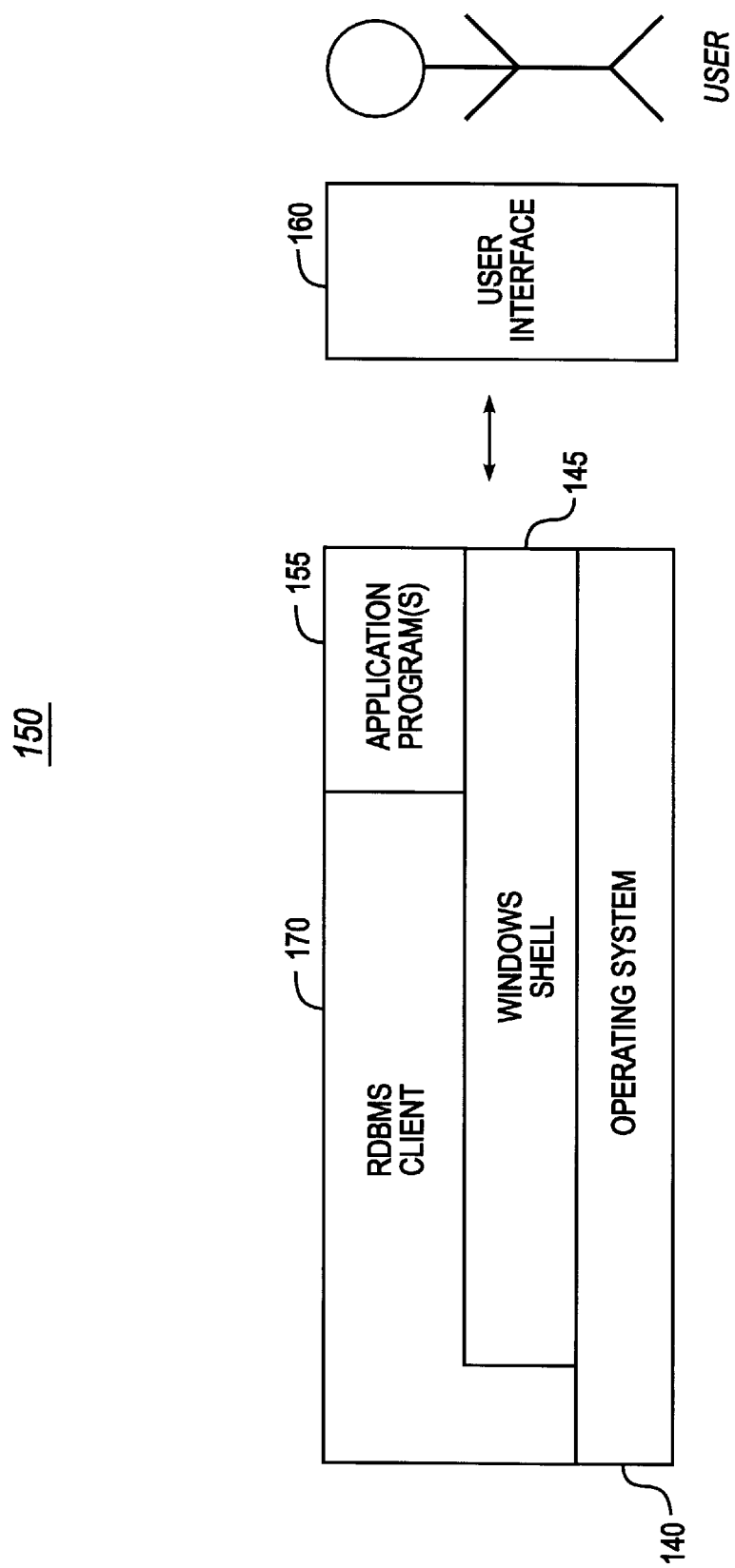
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows shell 145. One or more application programs, such as application software 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder™, dBASE®, Paradox®, Microsoft® Access, or the like. In an exemplary embodiment, the front-end will include SQL access drivers (e.g., Borland SQL Links, Microsoft ODBC drivers, Intersolv ODBC drivers, and the like) for accessing SQL database server tables in a Client/Server environment.

Client/Server Database Management System

Figure 2A:
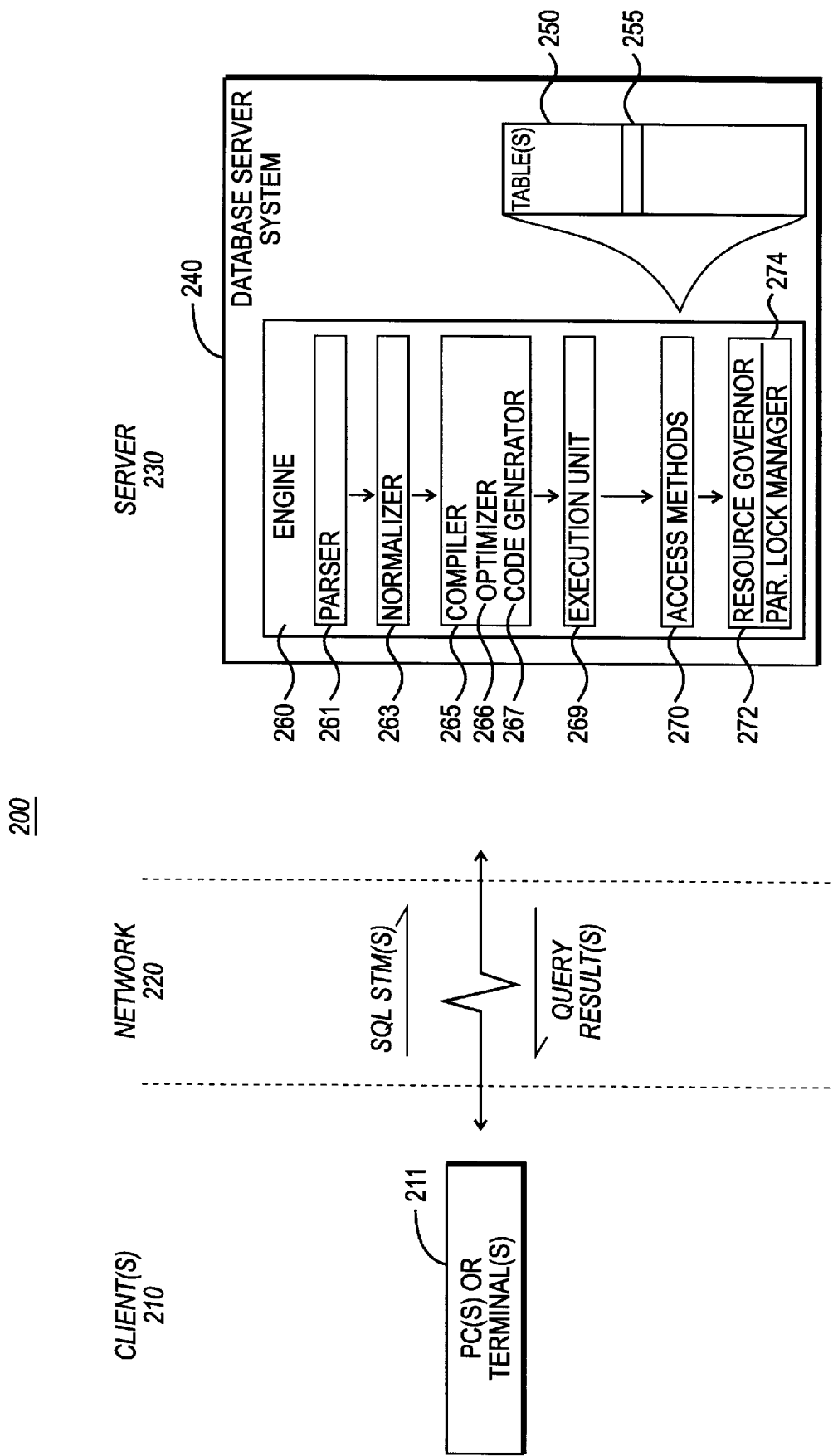
FIG. 2A is a block diagram of a client/server system in which the present invention may be embodied.

While the present invention may operate within a single (standalone) computer (e.g., system 100 of FIG. 1A), the present invention is preferably embodied in a multi-user computer system, such as a Client/Server system. FIG. 2A illustrates the general structure of a Client/Server Database System 200. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (available from Sybase, Inc. of Emeryville, Calif.) in an exemplary embodiment, generally operates as an independent process (i.e., independently of the clients), running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) command syntax, together with any parameter information, into a format (of one or more packets) suitable for transmission across a cable or wire, for delivery to the Database Server 240.

Client/server environments, database servers, and networks are well documented in the technical, trade, and patent literature. For a discussion of database servers and client/server environments generally and SQL Server™ particularly, see, e.g., Nath, A., *The Guide to SQL Server*, Second Edition, Addison-Wesley Publishing Company, 1995 (previously incorporated by reference). Additional documentation of SQL Server™ is available from Sybase, Inc. as *SQL Server Documentation Set* (Catalog No. 49600). For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table 250. The syntax of SQL (Structured Query Language) is well documented; see, e.g., the above mentioned *An Introduction to Database Systems*. In addition to retrieving the data from Database Server tables, the Clients also include the ability to insert new rows of data records into the table; Clients can also modify and/or delete existing records in the table.

For enhancing the speed in which the Database Server stores, retrieves, and presents particular data records, the Server maintains one or more database indexes on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file.

In operation, the SQL statements received from the one or more Clients 210 (via network 220) are processed by Engine 260 of the Database Server System 240. The Engine 260 itself comprises a Parser 261, Normalizer 263, Compiler 265, Execution Unit 269, Access Methods 270, and Resource Governors 272. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes arc available). The Optimizer, therefore, performs an analysis of the query and picks the best execution plan, which in turn results in particular ones of the Access Methods being invoked during query execution.

The Code Generator 267, on the other hand, converts the query tree into a set of instructions suitable for satisfying the query. These instructions are passed to the Execution Unit 269. Operating under the control of these instructions, the Execution Unit 269 generates calls into lower-level routines, such as the Access Methods 270, for retrieving relevant information (e.g., row 255) from the database table 250. After the plan has been executed by the Execution Unit, the Server returns a query result or answer table back to the Client(s).

To retrieve information, the Access Methods 270 must at times make use of resources provided by the Server. To do so, the Access Methods 270 employ Resource Governors 272 which control allocation of such Server resources as buffer caches, locks, and the like. For these functions, Resource Governors 272 employ separate managers such as a buffer manager for controlling the contents of buffer caches employed by the server to buffer database records.

Parallel Lock Manager 274 (hereinafter, simply "Lock Manager") is one such resource governor or manager. It provides lock management for the Resource Governors' internal clients (e.g., Access Methods 270)—controlling all client locking. The Lock Managers allocate locks, deallocate/release locks, search for deadlocks, and the like. The Lock Manager 274 manages different lock types, each one for controlling access to a different type of system resource. Lock types include address locks, table locks, pages locks, and semaphore locks. The name of each lock suggests its functionality. For instance, an address lock locks a memory address—a buffer. The address locks control access to objects in memory, such as database buffer caches. Specifically, an address lock is a lock on a memory location having a particular specified buffer address. The semaphore locks control access to a system log table(s) so that tasks can enter log entries as necessary. Thus, when a task is ready to log its transaction, it first takes out a semaphore lock. Both address and semaphore locks are system internal locks (i.e., not typically visible to user applications). The table locks control access to tables within the database, and page locks control access to individual pages (e.g., index pages and data record pages) stored in the database. Both the page locks and table locks are user visible locks. Each may be processed indirectly (e.g., through SQL statements) by a user application. Although there are different lock types, the Lock Manager 274 largely views the different lock types generically—applying the same or similar management methodology to each type.

As Access Methods 270 must grab locks to access specific records in the database, the Access Methods 270 represent an internal client of the Lock Manager— communicating directly with Lock Manager 274 for obtaining such locks. In this regard, Lock Manager 274 provides an internal application programming interface ("API") to its internal clients, such as the Access Methods 270. Note that because the Lock Manager 274 is a global resource, identical copies are provided in each engine of a database network (as identical pieces of server code).

Figure 2B:
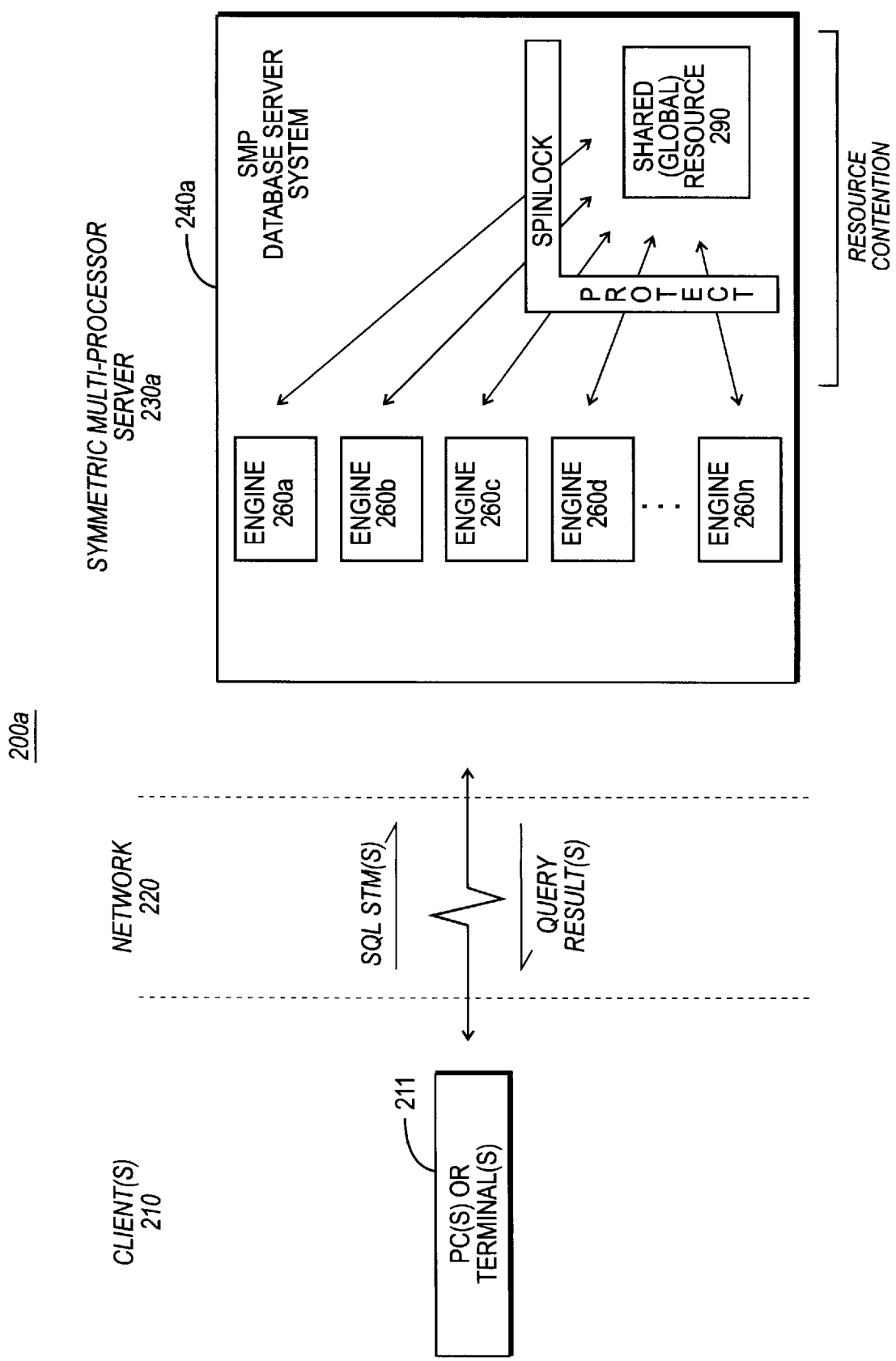
FIG. 2B is a block diagram of an SMP client/server system in which the present invention may be preferably embodied.

Of particular interest herein is an embodiment of the present invention in the Client/Server System 200 operating on an symmetric multi-processor (SMP) computer system. Such an embodiment is shown in FIG. 2B, as Client/Server System 200a. The system includes an SMP server 230a providing an SMP Database Server System 240a. Here, the SMP Database Server System supports multiple database engines (i.e., multiple instances of the engine 260), including engines 260a through 260n, up to an arbitrary number of database engines.

Ideally, as more processors are added to the SMP server 230a, the Database Server 240a can scale up with additional database engines. Note, however, that certain resources must be shared among the multiple engines, such as global resources require for accessing a common database table. Shared data structures or resource 290, shown in FIG. 2B, is one such resource. So that each engine "sees" the same resource (i.e., has a consistent view), access is protected by a "spin" lock—a well known SMP synchronization mechanism employed for controlling access to lower-level, system critical resources. Note particularly that, as more engines are added to the system, the contention for the shared resource 290 increases. This presents a single bottleneck for all engines.

Figure 2C:
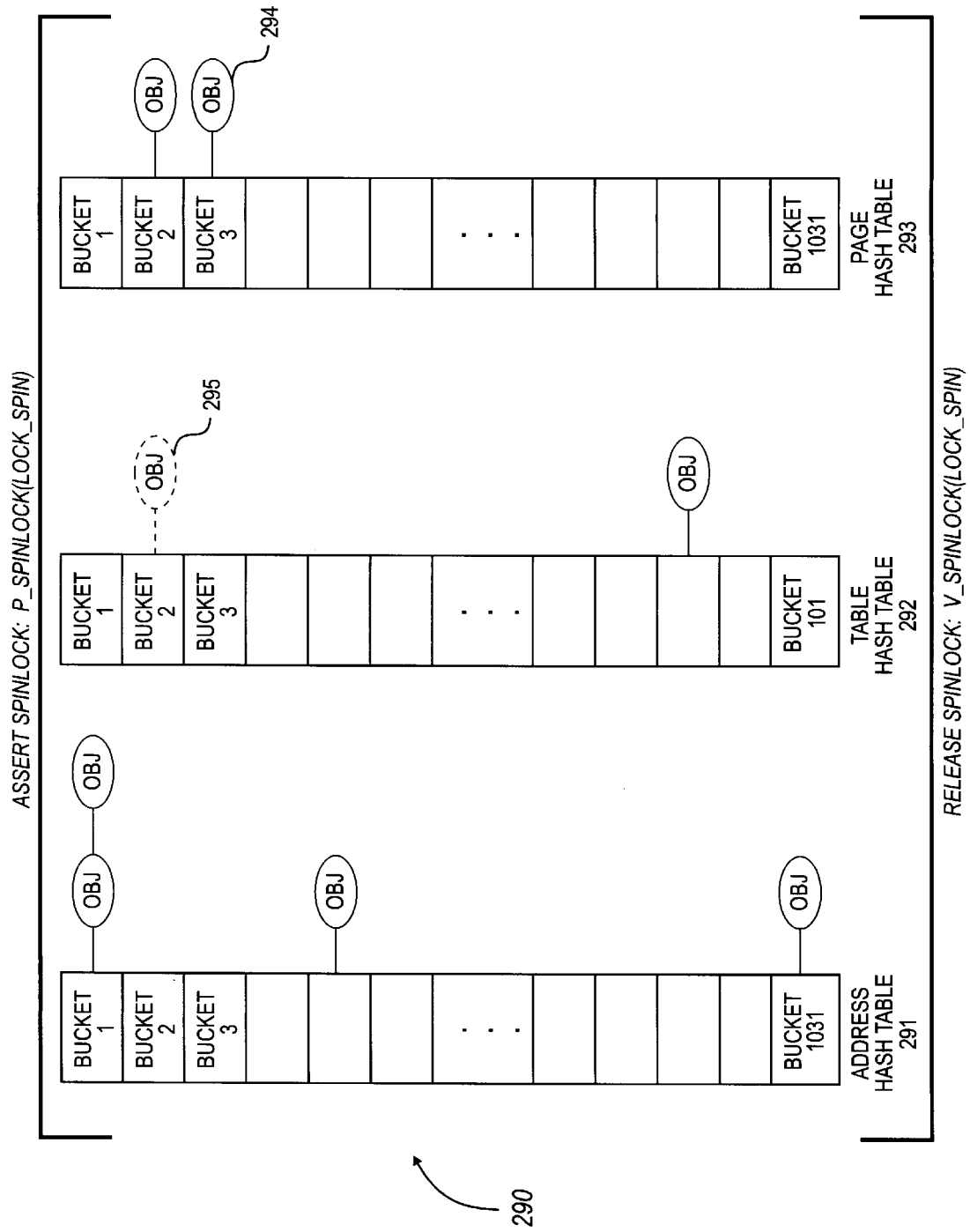
FIG. 2C is a block diagram illustrating shared Lock Manager structures in the client/server system of FIG. 2B which are, before modification in accordance with the present invention, under control of a single spin lock.

The shared global structures of the Lock Manager 274 is shown in particular detail in FIG. 2C as shared resource 290. These shared structures, which represent the locking status among multiple users running on multiple engines, are preferred over per-engine data structures. In particular, providing multiple instances of lock management data structures would require less-efficient interprocess communication management—an approach to be avoided. Instead, therefore, the preferred approach is a single set of data structures which are shared among the multiple engine instances.

The layout of the data structures is designed to facilitate this sharing. In particular, the structures comprise hash tables for processing requests for different lock types in the system, including an "address" hash table 291, "table" hash table 292, and "page" hash table 293. In particular, information about which of the various locks have been "taken out" is stored by the particular hash table associated with each lock type. For instance, the address lock hash table 291 manages address locks; the table lock hash table 292 manages table locks; and the page lock hash table 293 manages page locks. Each hash table itself includes a plurality of "hash buckets" for storing information about locks and lock requests from various tasks. For instance, the table hash table 292 includes 101 available hash buckets. The address hash table and the page hash table, on the other hand, both have 1031 available hash buckets.

Given the multi-processing nature of the system of the present invention, access to the hash tables must occur with SMP synchronization. Suppose, for example, that a user task from engine 260a—task$_1$—desires to acquire a page lock on the object 294. A page lock is represented by page hash table 293. The task must index into the hash table, for bucket #3. There, the task determines whether the task can be granted the lock or the task must wait for the lock. During this lock operation, task, protects the Lock Manager's structures 290 from change by another task, by tasking out a spin lock. After task$_1$ has completed the lock operation, it releases the spin lock.

Prior to modification in accordance with the present invention, the Lock Manager's shared data structures 290 were protected by a single spin lock (LOCK_SPIN), which serialized access to the address, page, and table hash tables. Whenever a task held this spin lock, it protected the shared Lock Manager data structures entirely (against concurrent changes by other tasks). This approach, to a large extent, simplifies system design. At the same time, however, the approach leads to high contention among multiple engines for the single spin lock. For the example above, for instance, while task, was processing a page lock, another task, say task$_2$, cannot process a request for an address lock.

To reduce this contention, therefore, the present invention provides the Lock Manager 274 with methods for parallel lock management—decomposing the (prior) single spin lock into multiple spin locks, each protecting individual hash buckets or groups of hash buckets. Decomposing the (prior) spin lock into multiple spin locks greatly reduces contention for the Lock Manager's data structures and thereby improves the system's scalability. At the same time, however, existing lock management methodology, such as conventional "deadlock" searching, depended on the simplicity of a single spin lock for protecting these interdependent structures—that is, that Lock Manager's data structures were all frozen by a single spin lock (i.e., would not be changed by another task). Accordingly, implementation of parallel lock management requires improved "deadlock" searching methodology. Details of the construction and operation of the Lock Manager for achieving this will be described below.

Improving system scalability: Parallel Lock Manager

A. Increasing scalability by removing single spin lock bottleneck

Given the multi-processing nature of the system of the present invention, access to the hash tables occurs using the multi-processor synchronization spin lock technique previously described for FIG. 2C. To improve system scalability, however, the spin lock technique is modified. Specifically, the single spin lock (LOCK_SPIN) employed for protecting the Lock Manager's hash table data structures is decomposed into a configurable number of spin locks, employed in conjunction with other spin locks as follows:

(1) Configurable number of spin locks (LOCK_SPIN) for:
   (a) Address lock hash table;
   (b) Page lock hash table;
   (c) Table lock hash table;
(2) One spin lock for semaphore locks;
(3) One spin lock for a freelock list (LOCK_FREELIST_SPIN); and
(4) One spin lock for a sleep task queue (LOCK_SLEEPTASK_SPIN).

The scenario of one engine running is handled as a special case: the Lock Manager will allocate only one spin lock, to avoid wasting memory on spin locks for a single-engine server.

Figure 3A:
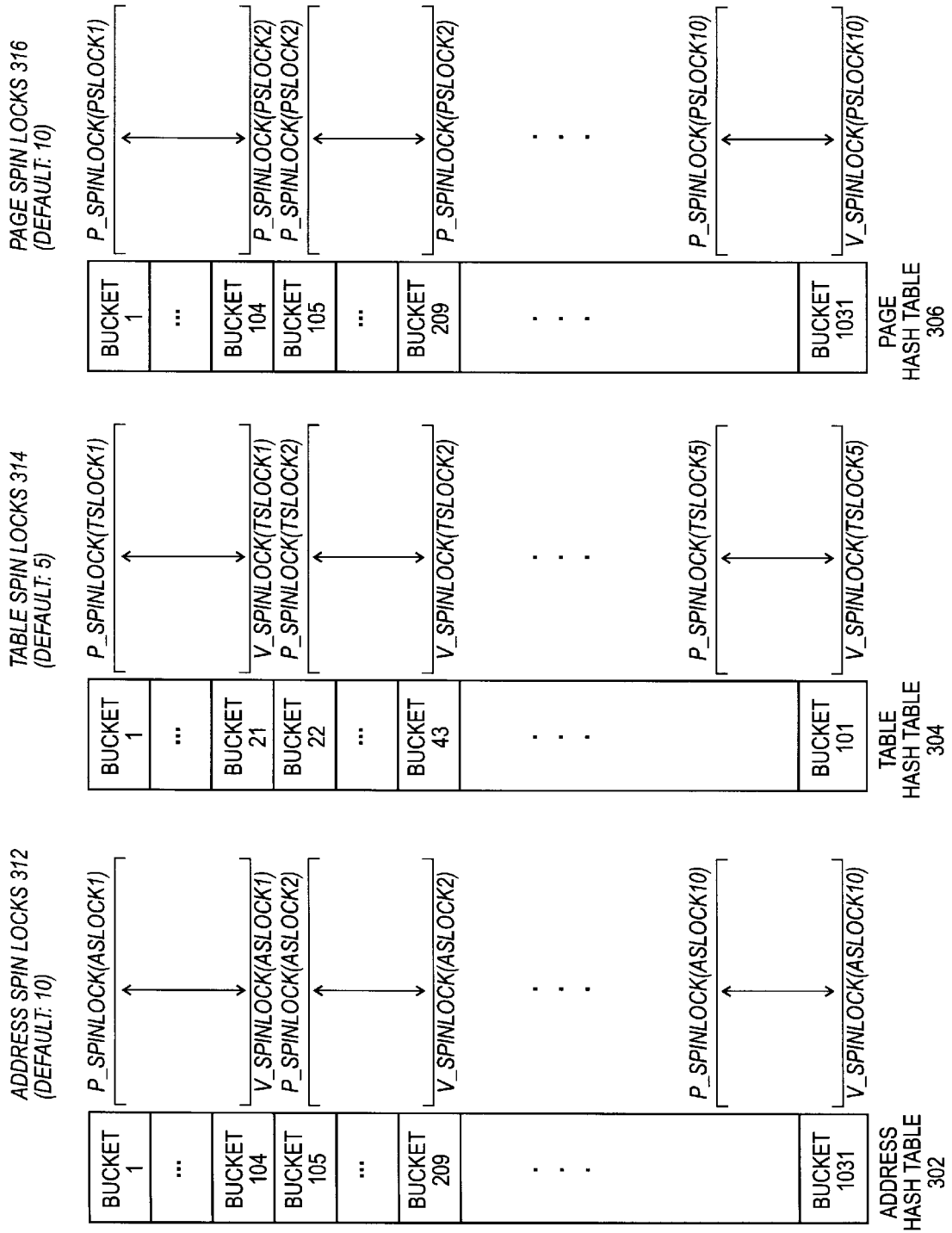
FIG. 3A is a block diagram of a Lock Manager illustrating shared Lock Manager structures which have been modified in accordance with the present invention.

FIG. 3A illustrates the modification necessary for implementing this design, with particular emphasis on management of address, page, and table locks. In general, each hash table has one or more spin locks, each spin lock for controlling a subset or range of one or more hash buckets for the table. In the exemplary embodiment depicted in FIG. 3A, for instance, the 1031 hash buckets of address lock hash table 302 are controlled by a plurality of spin locks 312 (numbering 10, by default). In a similar fashion, the 101 hash buckets of table lock hash table 304 are controlled by a plurality of spin locks 314 (numbering 5, by default), and the 1031 hash buckets of page lock hash table 306 are controlled by a plurality of spin locks 316 (numbering 10, by default). Thus, for example, a first one of the page spin locks 316 controls access to hash buckets 1–104 for the page lock hash table 306. In this manner, contention is substantially reduced: locks only block when two tasks each concurrently require access to hash buckets covered by the same spin lock. In previous systems, in contrast, a single spin lock was always used to protect such structures and, thus, always presented a bottleneck.

By associating groups of hash buckets with a particular spin lock, spin locks in the system of the present invention are conserved. As described below, the number of spin locks employed for each hash table is user (administrator) configurable. The simplest use is to configure the system such that the minimum number of spin locks is employed: one spin lock for each hash table. Even at this minimum, contention is reduced: processing a lock request of one type of lock (e.g., page lock) will not block access to other types of locks (e.g., address locks). At the other extreme, the user can allocate one spin lock for each and every bucket (up to the number of spin locks available in the system). Here, increasing the number of spin locks increases parallelism available with a given lock type—contention for other hash buckets within a given table decreases as the number of spin locks assigned to that table increases. In typical use, the user will configure or tune use of available spin locks to optimize system performance; the default settings shown in FIG. 3A provide good results for an embodiment scaling up to ten processors. In this manner, contention for access to the Lock Manager can be reduced while preserving efficient use of system spin locks, thereby allowing the system to appropriately scale up as more engines are added to the system.

B. Hash bucket storage: chain of lock records/objects

Each hash bucket stores locking information which is maintained by the Lock Manager 274. Specifically, each hash bucket stores information about which task holds a particular lock. More particular, each hash bucket is capable of chaining lock data structures—lock records or objects— off of it, for storing detailed locking information.

Figure 3B:
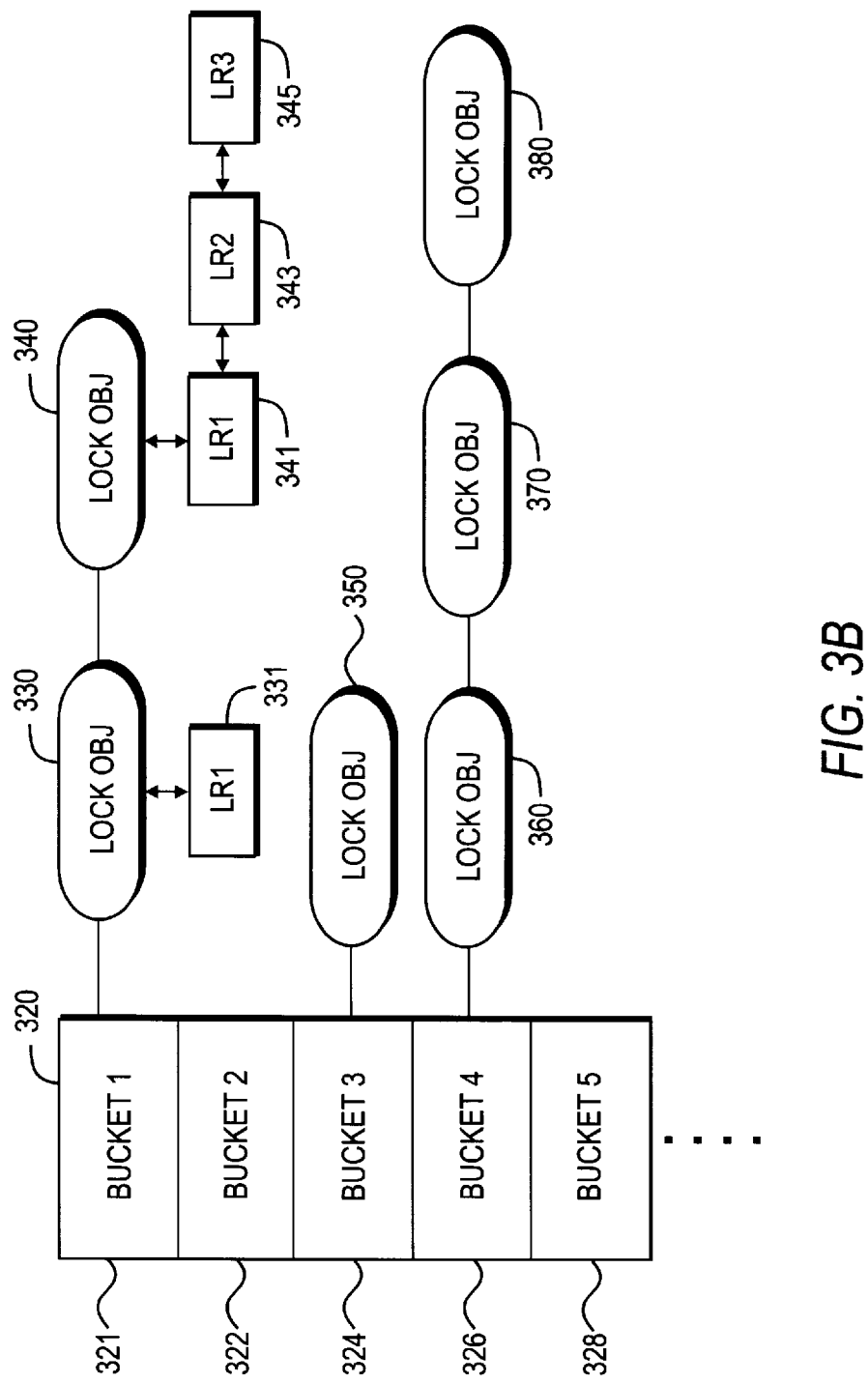
FIG. 3B is a block diagram illustrating layout and use of hash tables provided by the shared Lock Manager structures.

FIG. 3B illustrates this approach. Each object currently "locked" is represented by a "lock object" associated with a particular hash bucket. In the example shown in FIG. 3B, hash bucket 321 of hash table 320 includes two lock objects 330 and 340 "hanging off" it (i.e., linked to it via pointers). Hash bucket 324, on the other hand, contains a single lock object 350; hash bucket 326 contains three lock objects 360, 370, and 380. If no locks associated with a given hash bucket are currently taken, then the hash bucket or entry is empty— no lock objects will be found hanging off such a hash bucket. This is the case with hash buckets 322 and 328 shown in FIG. 3B. This approach of hanging multiple locks off each hash bucket (i.e., the hash bucket overflow structures shown in FIG. 3B) allows a large number of locks to be represented with relatively few hash buckets. The address hash table 302 illustrated in FIG. 3A, for instance, can represent 10,000 or more address locks with only 1031 hash buckets.

To actually index into a particular hash bucket, the system employs a "hashing function" which is based on the number of available buckets. Construction of various hashing functions, as well as hash table techniques in general, are well described in the technical and trade literature; see e.g., Bark, R. *Hashing: From Good to Perfect*, The C Users Journal, pp. 41–52, the disclosure of which is hereby incorporated by reference. For the address hash table, a simple hash function of "modulo 1031" may be employed. Here, indicia for address lock 1 is stored in hash bucket 1, indicia for address lock 2 is stored in hash bucket 2, indicia for address lock 1030 is stored in ("hanging off" of) hash bucket 1030, indicia for address lock 1031 is stored in hash bucket 1031, and so on. Note, however, that address lock 1032, also "hashes" to hash bucket 1: it has a value of 1 when evaluated with the hash function. Thus, hash bucket 1 stores indicia of address lock 1, address lock 1032, address lock 2033, an so forth and so on. Each one of the address locks therefore represents a separate overflow structure which forms an overflow chain hanging off a particular bucket.

C. Processing lock requests

1. General

The Lock Manager processes requests for any type of lock generally as follows. Initially, the Lock Manager receives a task's request for a lock from Access Methods 270. In response to this request, the Lock Manager goes to the hash table associated with the type of lock requested and hashes into the location specified as the address of the object for which the lock is sought; as described above, the Manager takes out the spin lock associated with the bucket being indexed into. At that bucket, the Lock Manager can determine whether any lock objects are present at that location. If no lock object is found at the indexed-into hash bucket, the desired lock is immediately available and can be provided to the requesting task. If, on the other hand, one or more other tasks have previously requested a lock on the item at that location, the Lock Manager must queue the present request.

Regardless of whether an object is already found at the hash bucket of the desired lock, when a task requests that lock, the Lock Manager creates a lock record for the task and queues that request—that is, links it into the chain of lock objects hanging off the hash bucket. After the request is queued, the Lock Manager checks to determine whether that request is at the head of the queue. A lock request (lock record) is at the head of the queue when no other lock object precedes it. In such a case, the lock is immediately available and the request is "granted." If not, however, the task "sleeps" on the lock request.

2. Exclusive lock processing

Figure 4A:
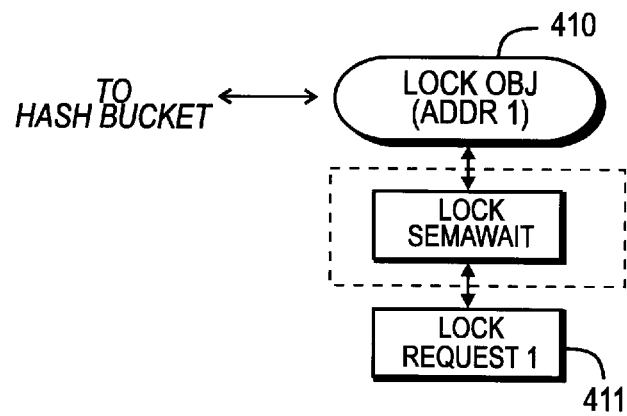
FIG. 4A is a diagram illustrating use of data structures "hanging" off a hash table entry ("hash bucket") for representing a request for an exclusive lock.

The process is perhaps best illustrated by way of example, using an address lock (an exclusive lock). It should be noted, however, that the Lock Manager handles lock requests for other lock types (and other lock strengths, e.g., "intent" locks) in an analogous manner. As shown in FIG. 4A, a hash bucket provides a lock object 410 for address 1. Such a lock object is generated upon a first request for a lock. Here, a request for address lock 1 comes to the Lock Manager from a first task. The Lock Manager evaluates the hash function to identify the appropriate hash bucket for address lock 1, grabbing the spin lock for the group of hash buckets containing that hash bucket. Now, the Lock Manager can traverse the overflow chain in that hash bucket, looking for any lock objects. If the Lock Manager finds no lock object for the address lock 1 on the overflow chain, the Lock Manager automatically creates lock object 410 for address lock 1 and queues that object to the overflow chain.

After the lock object is created, the Lock manager creates a "lock request" 411 for the first task and queues that lock request to a semawait (described below) which is connected to the lock object, as shown in FIG. 4A. The lock record, in this example, is a data structure indicating the task's request for an exclusive lock and includes various pieces of information about the task including the task's process ID. After the lock request 411 has been created and queued, the Lock Manager determines whether that lock record is at the head of the queue off of lock object 410. Because it is, in this example, the requesting task is granted the lock on address 1. The spin lock on the hash bucket is then released.

Figure 4B:
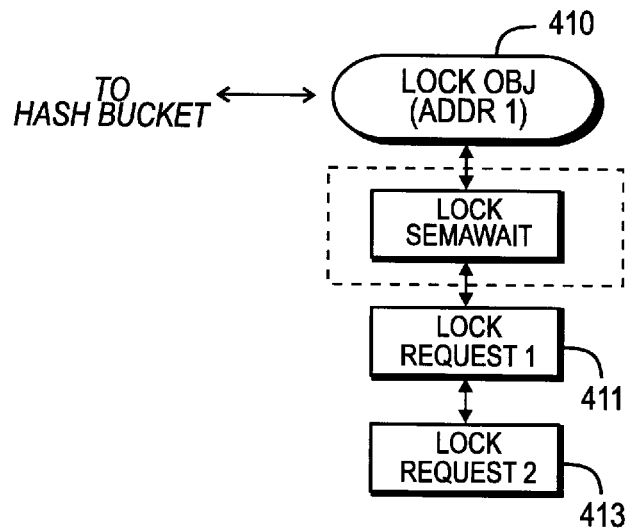
FIG. 4B is a diagram illustrating use of data structures for representing multiple requests for exclusive locks.

Next suppose that another request for access to the address 1 lock arrives. This scenario is illustrated in FIG. 4B. The Lock Manager again evaluates the appropriate hash function, grabs a spin lock for the identified hash bucket, and traverses the structures provided in that hash bucket. In this scenario, the Lock Manager finds lock object 410 associated with address lock 1032. Because a lock object currently exists for address lock 1 (i.e., object 410), the Lock Manager need not create a new lock object. The Lock Manager does, however, create a new lock request 413 and appends it to a queue of lock requests hanging off lock object 410. The Lock Manager then determines whether the newly-created lock request 413 is at the head of the queue. In the example of FIG. 4B, it is not at the head as the task associated with lock request 411 currently holds an exclusive lock on the address lock. Therefore, the second task must wait for the lock; at this point, it can go to sleep.

A waiting task's request is granted only after all tasks in front of it in the queue have released their locks. As various tasks release the lock, the lock requests of other tasks move forward to the head of the queue. In one particular embodiment when a task releases its lock, it first dequeues its lock request and determines which task follows it in the queue. It then wakes up that task. At this point, the newly awakened task resumes execution with the newly-granted lock.

In the example of FIG. 4B, when the task associated with lock request 411 releases the lock (address 1), the task dequeues the lock request 411, thereby causing the lock request 413 to move to the head of the queue. The task associated with the request 413 then wakes and continues execution with a lock on address 1. When it no longer requires the lock, it releases the lock, dequeues lock request 413, and wakes any subsequent task, whereupon the lock is passed on to yet another task.

3. Shared lock processing

The foregoing example illustrates an address lock—an exclusive lock. For an exclusive lock, if the request is at the head of the queue, the request is granted, as no two exclusive lock requests can simultaneously reside at the head of queue. Page and table locks, in contrast, may be either exclusive or shared (non-exclusive). As noted, a non-exclusive lock may permit one or more other non-exclusive locks to be taken out on the same object (e.g., database page). To implement non-exclusive or shared locks, the Lock Manager chains another data structure, a semawait, in addition to the above-described lock object and lock request data structures. The semawait indicates the position in the queue; each position has one or more shared lock requests or a single exclusive lock request. For efficiency in system design, all of these locking data structures share the same size and are allocated from the freelock list (described in detail below).

Figure 4C:
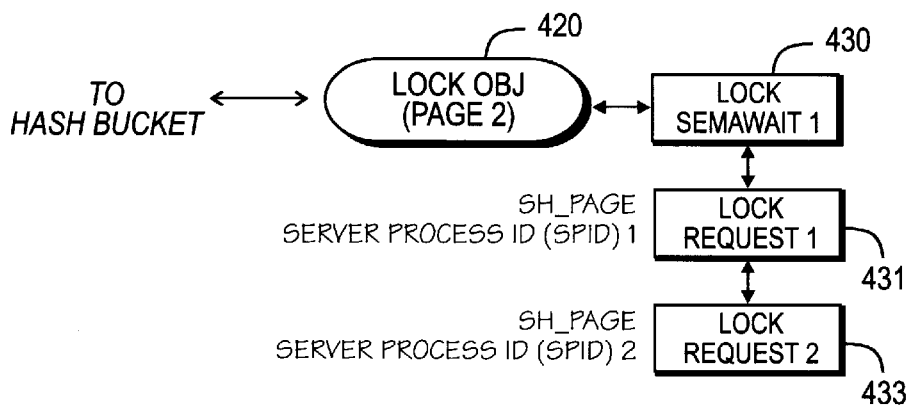
FIG. 4C is a diagram illustrating use of data structures for representing multiple requests for shared locks.

One exemplary process for generating an overflow chain for page locks will now be described with reference to FIG. 4C. Initially, a first task requests a non-exclusive lock on a page 2. In response, the Lock Manager identifies the appropriate hash bucket for the page 2 lock, takes out a spin lock on the associated subset of hash buckets, and hashes into the identified hash bucket. Assuming that the page 2 lock is not currently taken, Lock Manager 274 discovers that no lock object exists for page 2 and creates lock object 420. Because the page lock request is for a non-exclusive lock, Lock Manager 274 then creates a semawait 430 which it appends directly off of page object 420, at the head of queue. Note that semawaits are employed only for non-exclusive locks. After the semawait structure has been created and queued, the Lock Manager creates a first non-exclusive lock request 431, appended directly off of semawait 430, and containing information about the first task. The first task then releases the spin lock on the subset of hash buckets.

Next, a second task also requests a non-exclusive lock on page 2. At this point, the Lock Manager grabs the appropriate spin lock, hashes into the hash bucket, and discovers page lock object 420 with semawait 430 and non-exclusive lock request 431. The Lock Manager then produces a second non-exclusive lock request 433, which it queue up (i.e., appends directly to the prior non-exclusive lock record 431). Both the first and second tasks now hold non-exclusive locks on page 2 and continue executing with shared access to page 2.

Figure 4D:
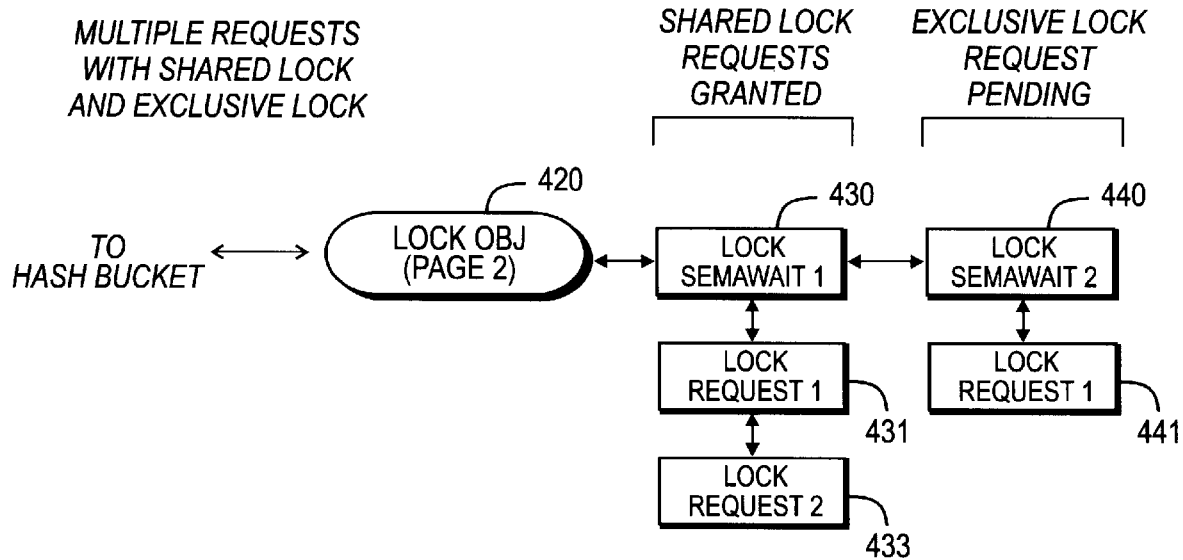
FIG. 4D is a diagram illustrating use of data structures for representing multiple requests for both shared and exclusive locks.

Now, consider a third task which requests an exclusive lock on page 2. This scenario is illustrated in FIG. 4D. Because this exclusive lock is incompatible with the non-exclusive locks currently held on page 2, the third task's request cannot be granted immediately. Thus, Lock Manager 274 generates a semawait 440 with a lock request 441 for the third task and queues it to the main overflow chain off the lock object for page 2. At this point, the third task will wait for the prior semawait to be dequeued; at this point, it can go to sleep.

Figure 4E:
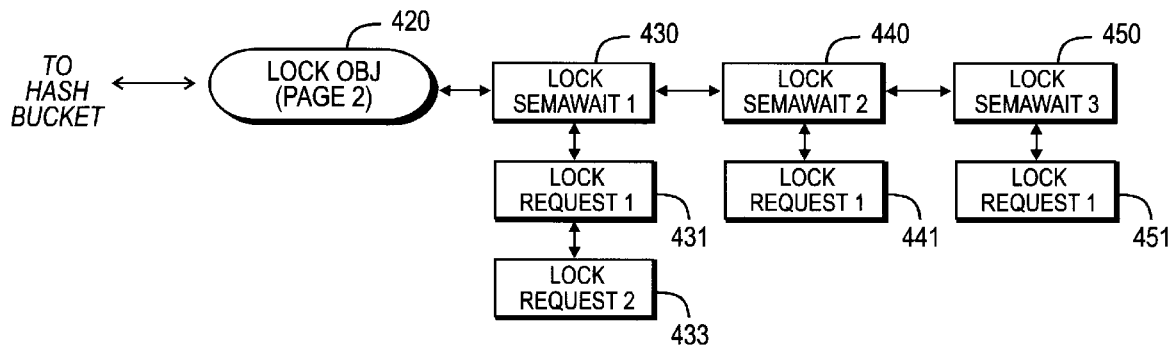
FIG. 4E is a diagram illustrating addition of a new request for an exclusive lock.

Next, consider a fourth task which also requests an exclusive lock of page 2. Again, this request cannot be granted because the desired exclusive lock would not be lock compatible with the currently held non-exclusive locks. Further, note that this exclusive lock would not be lock compatible with the prior exclusive lock, as exclusive locks cannot co-exist on the same object. Thus, Lock Manager 274 generates yet another semawait 450 and appends it to the overflow chain with a lock request 451 for another exclusive lock, as illustrated in FIG. 4E. The fourth task now waits on this newly-added lock request; it can sleep at this point.

Figure 4F:
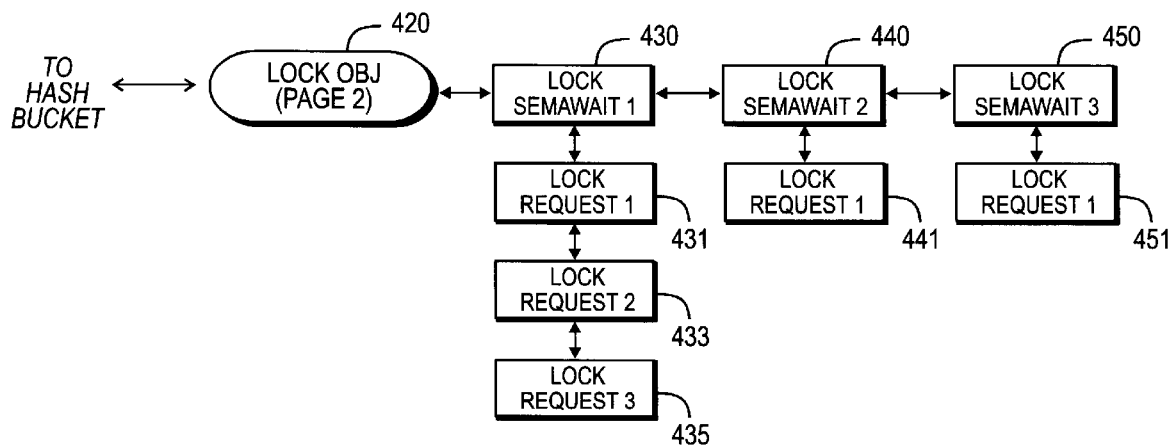
FIG. 4F is a diagram illustrating addition of a new request for a shared lock.

Finally, consider a fifth task which requests a non-exclusive lock on page 2. This non-exclusive lock is lock compatible with the currently held non-exclusive locks of the first and second tasks. As shown in FIG. 4F, therefore, the Lock Manager links the corresponding lock request 435 to the first semawait 430, thereby granting the newly-requested non-exclusive lock to the fifth task.

After the first, second, and fifth tasks deallocate their non-exclusive locks, semawait 430 and its non-exclusive lock requests are dequeued. As a result, the second semawait 440 and its exclusive lock request 441 move to the head of the queue. Concurrently therewith, the third task wakes up and continues execution with an exclusive lock on page 2. When this task subsequently deallocates its exclusive lock structures, the third semawait 450 and its exclusive lock request 451 move to the head of the queue. The fourth task thus continues execution with its requested exclusive lock on page 2. Thereafter, the task dequeues the lock request. After all lock requests and semawaits have been dequeued, the lock object itself is de-allocated.

Note that the above scenario for handling requests for both exclusive and non-exclusive locks could allow the third and fourth tasks to remain waiting indefinitely while additional requests for non-exclusive locks are received and queued off of the first semawait 430. To address the situation, the Lock Manager is preferably designed such that a queued request for an exclusive lock waits on no more than a certain number of non-exclusive lock requests lodged after it was queued (i.e., "skip" factor). In one particular preferred embodiment, a task requesting an exclusive lock will allow no more than four non-exclusive locks requests to be queued before it, after it has made its request for the exclusive lock. In this case, if an fifth request for a non-exclusive lock comes in, a new semawait is created and appended to the end of the overflow chain (behind any lock requests for exclusive locks). In this manner, subsequent requests for non-exclusive locks are queued through a subsequent semawait, rather than the semawait in front of the exclusive lock record.

D. Deadlock Detection in the Parallel Lock Manager

1. General

"Deadlock" is a well-known scenario when two or more tasks go to sleep waiting (directly or indirectly) for each other to release their respective locks on resources that they are accessing. To detect a deadlock, a database system performs a deadlock search for examining sleeping tasks to identify any "cycles," i.e., a dependency chain which points back to the sleeping task that initiated the search. The presence of such a cycle indicates a deadlock. When one is identified, the server chooses a "deadlock victim" from among the tasks making up the cycle to break the deadlock. The system chooses a victim by any appropriate scheme. In one embodiment, the system chooses as a victim that task having used the least amount of CPU time. If there is more than one task with the least amount of CPU time, the task last visited among them is chosen. The transaction of the deadlock victim's task is rolled back. A general description of deadlock can be found in the abovementioned *An Introduction to Database Systems* (at pages 415–417).

Figure 5A:
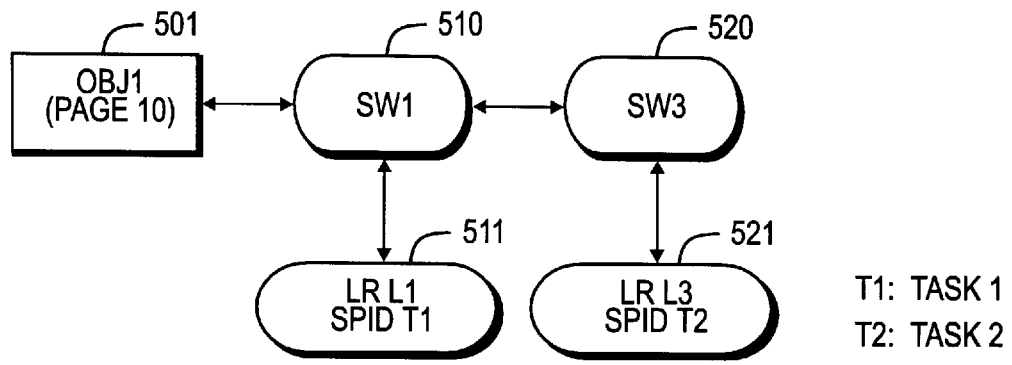
FIG. 5A is a diagram representing lock record (i.e., lock "request") and semawait data structures that correspond to a simple deadlock.
Figure 5A:
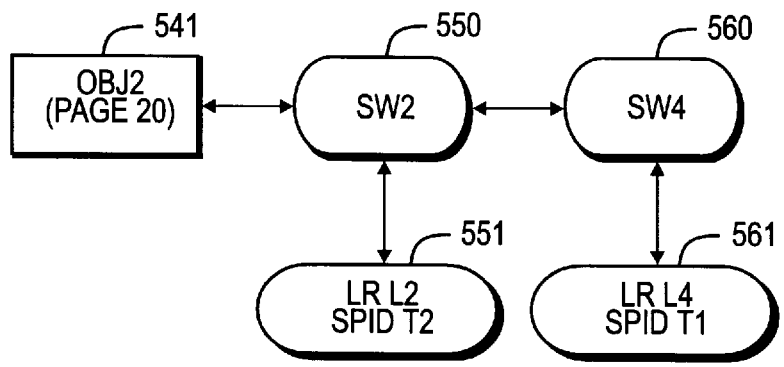
Figure 5B:
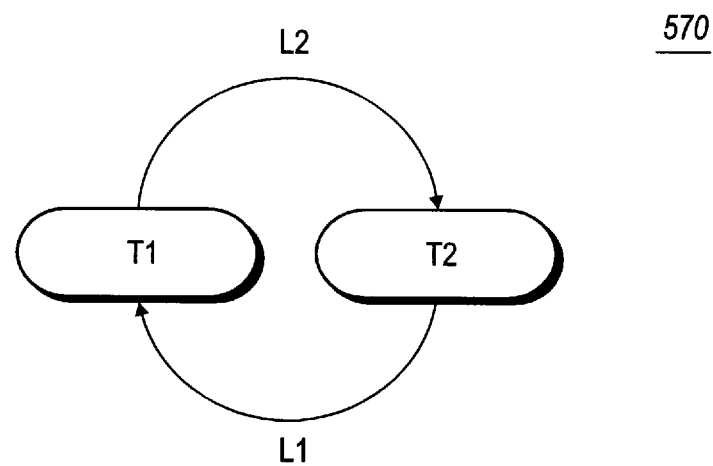
FIG. 5B is a diagram of a "direct dependency graph" generated during a deadlock search of the data structures shown in FIG. 5A.

A simple deadlock is illustrated in FIG. 5A, with a "directed dependency graph" for the deadlock represented in FIG. 5B. Assume that a first task, T1, requests a page lock on a page 10. As shown in FIG. 5A, a lock object 501 is created for page 10 to which the task appends a semawait 510 having lock request 511. Since no other task has a lock request queued for page 10, the lock is granted to first task. Now, a second task, T2, requests a lock on a page 20. In a corresponding manner, as shown in FIG. 5A, a lock object 541 is created for page 20 to which the second task appends a semawait 550 having lock request 551. Since no other task has a lock request queued for page 20, the lock is granted to first task.

Now, consider a request from the second task for a lock on page 10 (with the requested lock not being lock compatible with the existing lock). Because the fist task already holds a lock on page 10, the second task queues up its request (semawait 520 and lock request 521) and goes to sleep waiting for the lock on page 10 to be released. Note particularly that the second task is going to sleep while holding its lock on page 20. The first task, in a corresponding manner, now requests a lock on page 20 (with the requested lock not being lock compatible with the existing lock). The first task queues up its request (semawait 560 and lock request 561); since this is the first request, a lock object 541 is created from the page 20. Because the second task already holds a lock on page 20, the first task goes to sleep waiting for the lock on page 20 to be released. Under these circumstances, a deadlock has resulted. The locks on pages 10 and 20 will remain in perpetuity absent some intervention from the system, thus preventing both the first task and the second task from continuing execution.

FIG. 5B illustrates this "cycle" diagrammatically with directed dependency graph 570. As shown, the first task (T1) holds a lock on a first object (obj1) and is waiting for a lock on a second object (obj2). At the same time, the second task (T2) holds a lock on the second object (obj2) while waiting for a lock on the first object (obj1). Here, the locks (L1 and L2) represent "edges" of the graph. The T2 task created the L1 edge between T2 and T1. Then the T1 task created the L2 edge between T1 and T2.

2. Improved deadlock detection: "deferred" mode

To avoid deadlocks, a system must be able to detect deadlocks among sleeping tasks. Conventionally, each task undertakes deadlock searching immediately after it begins waiting on a lock request. A common approach is to employ a depth-first search of the dependency graph (a tree data structure), looking for cycles. If a cycle is found, the deadlock can be broken by selecting a deadlock victim. In many instances, however, a task's requested lock is immediately or quickly granted, therefore rendering deadlock searching moot. In many cases, therefore, immediate deadlock searching incurs unnecessary overhead and, thus, hurts system performance.

To address this inefficiency, the system of the present invention provides "deferred" deadlock detection. Here, a task simply goes to sleep on a lock; it does not initiate a deadlock search. Routinely, the task will be awakened with the lock being granted. If a deadlock is present, however, the task will not be awakened with a granted lock. To address this second case, the system provides a deferred mode of deadlock detection. For this mode, the system provides a user-configurable, periodic alarm. The user configures the alarm for delaying or "deferring" deadlock detection up to a certain time period. In a preferred embodiment, the delay is set to a default time period of 100 milliseconds. Setting the time period to 0 milliseconds indicates that deadlock detection is not deferred.

As before, a task using deferred mode continues to initiates the deadlock searching. However, "when" the task actually initiates deadlock searching changes. If the time period for the alarm is greater than zero, the task will not initiate the search at the time of sleeping on the lock. Instead, a periodic alarm handler will increment a counter until the specified time period is reached. The alarm handler works in conjunction with an "engine scheduler" to make sure that, if a task sleeps on a lock request for more than the configured time period, the task is awakened. This time, however, the task is awakened to initiate deadlock searching. More specifically, the alarm handler checks a "lock sleeptask queue" (described below) to see if there is a sleeping task that has waited for at least the "deadlock checking period." If such a task is found, the task is awakened so that it can perform its own deadlock search. In a preferred embodiment, only a single deadlock search may be conducted at any given time. Therefore, a semaphore (rdlc_status) is employed to control the process. If a deadlock search is being conducted by a first task, a second task may have to wait longer than the "deadlock checking period" period before initiating its own deadlock search.

In the present invention, the deadlock search is accomplished by examining the above-described locking structures—lock objects, semawaits, and lock records (as well as other data structures)—for identifying sleeping tasks that may be part of a cycle. This task is complicated by the fact that locks are managed in parallel: because multiple spin locks are employed on the Lock Manager data structures, the appropriate spin lock must be grabbed before the deadlock search can extract the necessary information from a particular hash bucket. To ensure that performance is not hampered, the system of the present invention preferably implements deadlock searches by repeatedly grabbing and releasing locks on hash buckets without holding more than one hash bucket spin lock at any given time. Specifically, during the deadlock search, the task performing the search first grabs the spin lock on the hash bucket for the first lock investigated in the search. Then after retrieving and recording the necessary information from data structures in that hash bucket, the Lock Manager releases the spin lock and takes out the spin lock on the hash bucket holding information about the next lock in the chain. After the relevant information is extracted from the second hash bucket, its spin lock is released, and so forth and so on.

Because the Lock Manager employs multiple spin locks when traversing Lock Manager data structures (namely, the hash buckets and their chains), deadlock detection should account for changes in lock status during the course of the search. Note that the various spin locks on the hash buckets are not frozen during the search so locks may be released and/or granted after the search is started but before it ends. Thus, deadlock searching itself is are dynamic—occurring while the system itself continues to operate. As a result, care must be taken to ensure that the data structures relied upon remain consistent. In contrast, if a single spin lock is provided for the entire Lock Manager, as was the case in with prior art systems, no data structures within the Lock Manager can change during the course of the deadlock search. That approach is simpler, but systems implementing that approach are effectively frozen while deadlock detection is underway.

Although deadlock searching in the system of the present invention occurs while the certain Lock Manager data structures are changing, the deadlock itself (i.e., the data structures associated therein) will not change. This is a unique property which can be exploited for providing improved deadlock detection methodology of the present invention. Specifically, if data structures change, then there is no deadlock and, hence, no need to continue the search.

3. Deadlock detection: dependency graph changes

The search algorithm detects deadlocks by forming a "directed dependency graph" (such as that shown in FIG. 5B) among tasks waiting for locks. In a directed dependency graph, each node is labeled by a task which is waiting for a lock. Consider the directed dependency graph 601, shown in FIG. 6A, at the point when T3 (third task) is adding the L3 (lock request) edge. The sequence of events is indicated by a sequence numbers (SN). Here, T1 (lock request L1) is waiting on T2 which, in turn, waits on T3 (lock request L2). Now, T3 adds the L3 "edge" (i.e., it wants the L3 lock which T4 holds).

In this example, task T1 would initiate the deadlock search, since it has waited longer. T1 holds a hash bucket spin lock for seeing what T1 is waiting on (specifically, what semawait). Here, T1 is waiting on T2. This information is recorded with a timestamp, whereupon the spin lock for the bucket is dropped. Now, the search examines T2, under spin lock protection (i.e., a different spin lock), to determine what it is waiting on. Again, the information is recorded with a timestamp, whereupon the spin lock for the T2 hash bucket is dropped.

Note that the sequence repeats: grabbing spin lock, recording information, and dropping spin lock for traversing the chain. Because spin locks are not held at the point of traversing from on member of the chain to another, the state of the chain can change—the data structures are potentially changing on-the-fly—while deadlock detection is underway. This is not a problem, however. Recall the unique property of a deadlock that it will not change. If anything is changing on-the-fly, then it is not a deadlock.

4. Spurious deadlocks

As noted, the search algorithm traverses lock object, semawait, and lock record data structures in appropriate hash buckets to generate the dependency graph. The system must detect deadlocks and avoid detection of spurious deadlocks. A spurious deadlock includes an apparent "edge" which has been recorded but which no longer exists as a result of on-the-fly changes to data structures. Since such a cycle is spurious, it must be distinguished from a true deadlock.

Figure 6A:
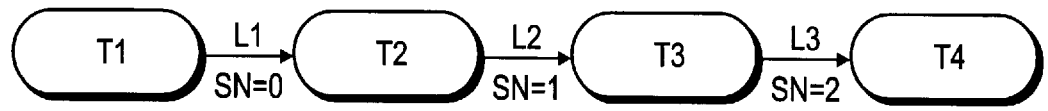
FIG. 6A is a diagram of a dependency graph of a hypothetical arrangement of tasks as those tasks might be queued at the beginning of a deadlock search.

FIG. 6A illustrates how a spurious deadlock (caused by a cycle formed after a search was initiated) may arise and be recognized. Recall that, in FIG. 6A, four tasks are sleeping. The order in which the tasks went to sleep is indicated by the sequence number; "sn=0" representing the first sleep event, "sn=1" representing the next sleep event, and so forth and so on.

Figure 6B:
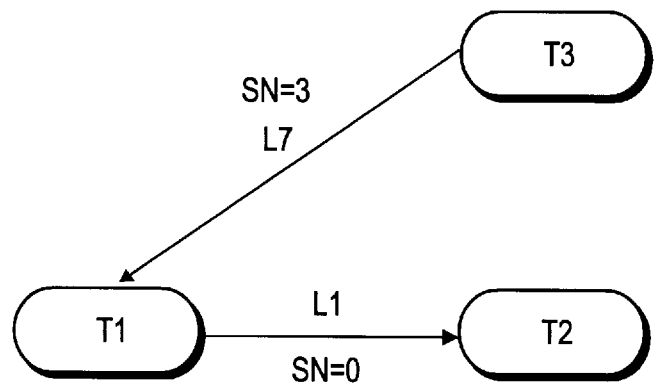
FIGS. 6B–C are diagrams of dependency graphs illustrating use of sequence numbers in the present invention for detecting "spurious deadlocks" for the tasks of FIG. 6A.
Figure 6C:
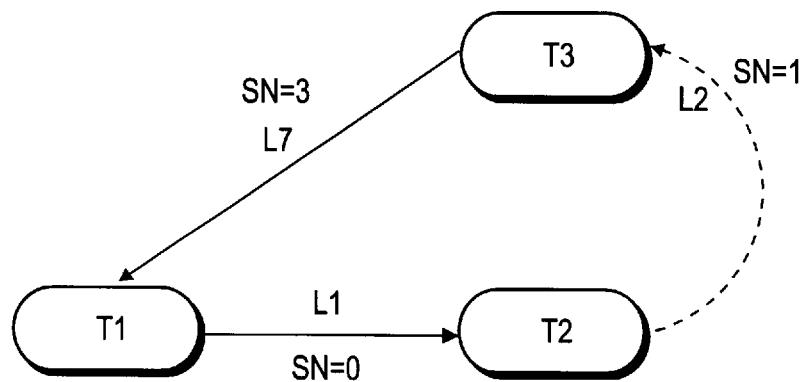

At a given point, task T1—the longest waiting task, will be awakened by the alarm routine for beginning a deadlock search. Suppose that, while the search is being conducted, task T2 releases the lock on which task T3 was waiting: edges L2 and L3 are now eliminated. Assume, however, that the deadlock search does not recognize this—possibly because it has already traversed edge L2. Now assume further that while the search is progressing, task T3 goes to sleep waiting on task T1 to release a lock. At that instant, the dependency graph would appear as shown in FIG. 6B. However, because the search traversed edge L2 before it was eliminated, the system may be lead to believe that the dependency graph appears as shown in FIG. 6C, with the dashed line for L2 assumed to exist. Thus, because the deadlock search is being conducted on a dynamic system, the searching task may believe that a deadlock exists when in fact none does.

To reduce the risk of detecting spurious deadlocks, the search algorithm preferably restricts its traversal to only those dependency edges that were already formed when the search started. The search is limited to those edges having "sequence numbers" less than or equal to the sequence number in existence for the task when the search began. Each number is an incrementally-increasing number assigned to a task which has to wait for a lock. During the search, the system uses the lock wait sequence number on the lock sleeptask queue to detect and discard edges that were formed after the search started. When performing deadlock detection, any edge the task is traversing which has a sequence number which is less than or equal that for the task will be examined. If the sequence number is greater than that for task, a new edge has formed and, thus, deadlock search need not be continued. Any new cycles formed from new edges may be detected by later searches (initiated after the cycles are formed). For the case of FIG. 6C, the search would disregard edge L7 having a sequence number of 3 because that edge was created after the search began. Specifically, when the search begins, the initiating task grabs the spin lock on the sleeptask queue and identifies the sequence number at that time. With this number, it can decide whether to record or ignore edges it encounters in its search.

5. Innocent bystander deadlock handling

Figure 7:
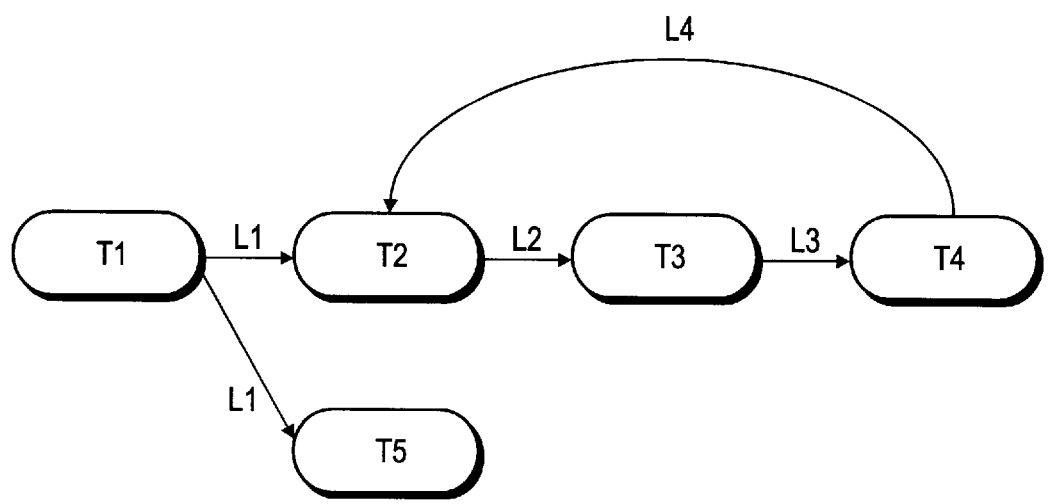
FIG. 7 is a diagram of a dependency graph for a deadlock search uncovering a cycle in which the initiating task did not form part of the cycle (known as the "innocent bystander deadlock").

FIG. 7 illustrates how the deadlock search method treats a cycle in which the initiating task does not part of the cycle. Initially, a task T1 queues a lock request L1 but is blocked because of a shared lock held by two tasks T2 and T5. It detects no deadlock when it traverses the edge (L1) to T5; however, it does identify a cycle when it traverses to task T4 through a task T3. At this point, the dependency graph contains a path in T1, T2, T3, and T4, with a cycle. Note, however, that T1 is not participating in the cycle and, thus, can be ignored. Nevertheless, the detection method does identify this as an "innocent bystander" deadlock. In a preferred embodiment, the search method does not try to break these types of deadlocks because of the expense involved. To choose an optimal set of victims, the method would have to record all the cycles it detects. Then it would have to select victims in a way that breaks all cycles, but leaves the least number of tasks victimized.

6. Multiple cycle deadlock handling

Figure 8:
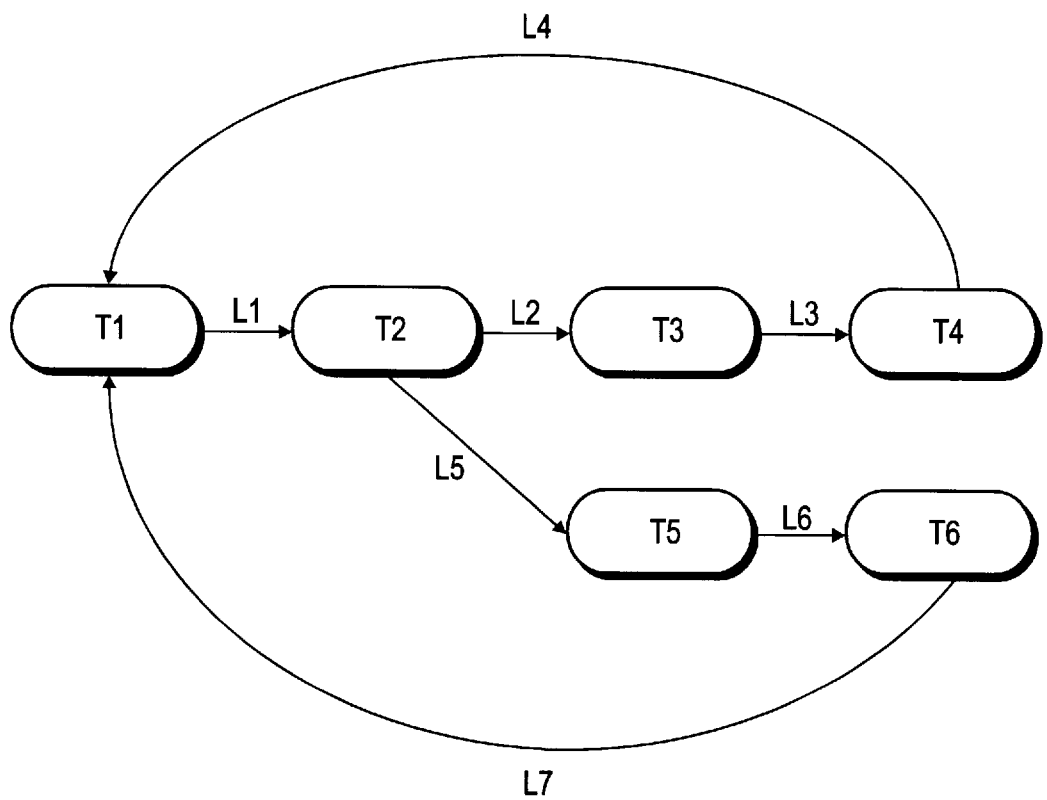
FIG. 8 is a diagram of a dependency graph for a deadlock search uncovering multiple cycles.

A task initiating a deadlock search can be involved in not just one cycle but in multiple cycles. This situation is illustrated in FIG. 8. As shown, the detection method detects a first cycle involving tasks T1, T2, T3, T4 and lock requests L1, L2, L3, and L4. It chooses one of the tasks, T1, T2, T3, and T4 as a possible victim, and the selection is recorded. The algorithm continues and eventually traverses edge L5, detecting the cycle involving T1, T2, T5, and T6 and lock requests L1, L5, L6, and L7. In a preferred embodiment, the system instead automatically rolls back the task initiating a deadlock search when that search determines that the initi-ating task forms part of two different cycles. Here, the detection method chooses T1 as the victim to minimize the number of deadlock victims selected.

7. Limiting deadlock searching

To limit the time that may be required to undertake a deadlock search, the system set a limit on the maximum number of nesting (recursions) performed in any search. In one embodiment, a variable "recursion level" is zero when the search algorithm begins and is incremented for each new level of recursion. If the value of the recursion level variable exceeds a preset maximum, the task initiating the search is chosen as the deadlock victim.

E. Improved "free" lock management: caching "free" locks

The actual locks themselves represent resources in the system represented internally by various underlying lock data structures. Each lock is either "free" (i.e., available for use) or "allocated" (i.e., in use). These data structures are maintained on a global "freelock" list in shared memory and which is available to all server engines. Lock requests are satisfied, in part, by allocating lock data structures from this list. The approach of a single global freelock list presents a bottleneck—a single point of contention, however. More particularly, many of the performance gains of parallel lock management would remain unrealized if a bottleneck elsewhere in the process remained uncorrected. The present invention addresses this problem by providing improved methodology for global freelist management.

Contention for the global freelock list is reduced by reducing the number of accesses to it. According to the present invention, each engine now has its own list of freelock structures, known as the "engine freelock cache." Specifically, the Lock Manager 274 implements engine-specific freelock lists, one per engine, in addition to the server's global freelock list. The general operation is as follows. When a task executing on a particular engine requires a lock structure, the task "grabs" the structure from its engine's freelock cache. If no more freelock structures are available to the task (i.e., its engine's freelock list is exhausted), a (user configurable) number of lock are "moved" (logically) from the global freelock list to the engine's freelock cache. Actual access to this global freelock list for this operation (i.e., for logically moving freelock structures to and from the individual engine caches) occurs under the control of the abovementioned single freelock list spin lock; this spin lock is the LOCK_FREELIST_SPIN spin lock. When a task releases a lock structure, the structure is returned to the engine's freelock cache. To ensure better utilization of lock resources (i.e., ensure proper load balancing), freelock structures are moved (logically) back from the engine's freelock cached to the global freelock list when the number of structures or elements in the engine freelock cache exceeds a configurable threshold. Since this operation touches the global freelock list, it also occurs under spin lock protection.

Actual "movement" of locks is logical not physical. Here, the locks are not physically moved from a global list memory location to the engine-specific freelock caches but, instead, remain in the shared memory location allocated for the global freelock list at start up time. Changes are made to the pointers that link the lock structures together, so that when locks are "moved," they are no longer referenced as part of a "free" lock on the global freelock list.

Figure 9:
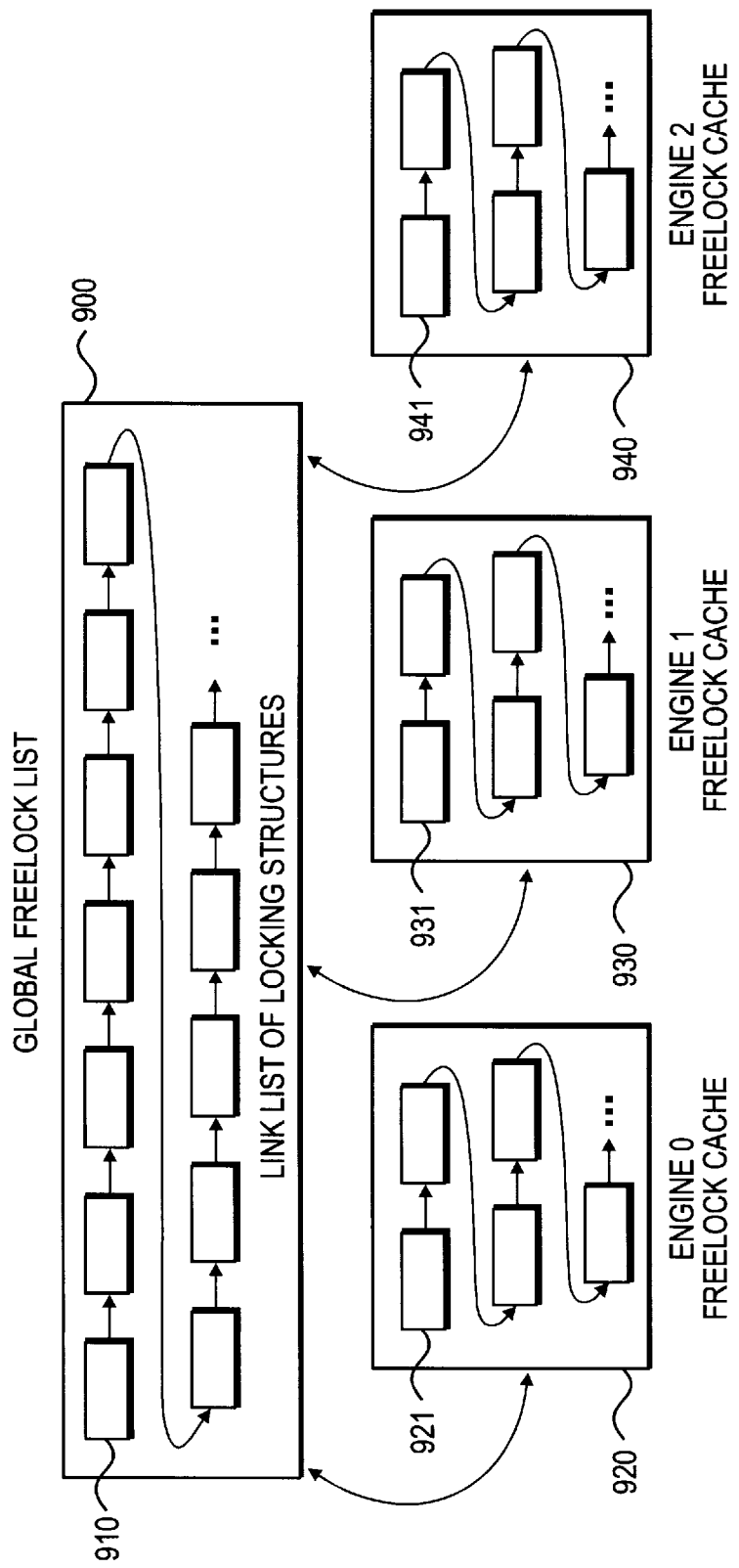
FIG. 9 is a block diagram illustrating a method of the present invention for improved management of global "free" locks.

FIG. 9 diagrammatically illustrates the above-described approach. As shown, a global freelock list 900 containing a global freelock list 910. These are available to the Lock Manager of each engine. As shown, for instance, "free" locks in list 910 are available to engine freelock caches such as cache 920 for engine 0, cache 930 for engine 1, and cache 940 for engine 2. Thus, one group of freelocks 921 has been transferred from list 900 to cache 920, another group of freelocks 931 is transferred to cache 930, yet another group of freelocks 940 is transferred to cache 941, and so forth and so on, up to an arbitrary number of engines. In the preferred embodiment, the actual size of each engine freelock cache and therefore the number of "free" locks which each holds is user configurable. With this approach of binding certain freelocks to particular engine caches, less contention exists for the global freelock list 900. Specifically, if a server engine requires a lock, it first looks to its own freelock cache, without tying up the global freelock list (and contending for its single spin lock). Only when no more freelock structures are left in an engine's own cache will a configurable number of freelock structures be moved from the global freelock list to the engine's own freelock cache.

F. Tuning lock management: user configurable settings

In preferred exemplary embodiments of the present invention, the end user—a database administrator (DBA) or application programmer—can configure the operation of the Lock Manager. The user may effect this by setting certain configuration parameters, for example. Such parameters control, for example, the deadlock search, the spin lock decomposition, and the freelock cache.

In some cases, for instance, it may be desirable to allow the user (e.g., system administrator or application programmer) to eliminate the deadlock search mechanism altogether. This might be appropriate when an application is running in which a deadlock is impossible, or at least highly unlikely. Such an application occurs when each task of the application is acting on independent data subsets. By allowing the administrator user to turn off the deadlock search mechanism for these classes of applications, system performance can be improved.

Even in those applications requiring deadlock searching, the user can configure the system by specifying when to begin deadlock searching—immediately when a task waits on a lock or at a later point in time (i.e., deferred). Here, the user specifies a "deadlock checking period" time—that is, when the time when system will perform deadlock searching. Upon the user specifying that checking should begin immediately (i.e., delay of 0), the system performs deadlock checking as soon as a task waits on a lock. Here, the system will catch a deadlock immediately, but the approach is computationally more expensive. Accordingly, the default mode of operation is to specify a delay period—deferred mode.

With deferred mode, the system does not do deadlock checking at the time of the "sleep" but, instead, defers it to some later point in time. This approach has a particular advantage. If the lock (which the task is waiting on) actually gets granted during the wait, deadlock checking is avoided altogether. In other words, there can be no deadlock since the lock was granted. Thus, the system administrator can, when for appropriate applications, configure the system to be smarter about deadlock checking.

Another exemplary user configurable parameter is the spin lock decomposition on the hash tables of the Lock Manager. As described above, the Lock Manager includes one or more spin locks on each of hash table. In one embodiment, the administrator user may configure the actual number of spin locks employed for each hash table. Thus, for example, a database administrator may configure the Lock Manager such that one spin lock is provided for every 100 hash buckets in the database pages, hash table, or every 10 hash buckets in the database pages hash table, and so forth, up to one spin lock for each hash bucket. In this manner, the user can configure the system for increased parallelism, for those environments having resources supporting an increased number of spin locks.

Still further, the Lock Manager may be designed such that the end user may specify the size of a "freelock cache." As noted, all locks provided by the Lock Manager are designated as either free or allocated. In this embodiment, the end user may specify what percentage of the total locks may be designated as freelocks for the database engines. It may also specify how many freelocks are transferred from the global freelock list to a server freelock cache when there are no more freelocks left in a server's freelock cache.

Internal operation

A. Lock Manager API

In an exemplary embodiment, the Parallel Lock Manager surfaces an application programming interface (API) to its internal clients (i.e., other modules within the database server). For purposes of implementing the present invention, the Lock Manager API preferably remains unchanged—that is, the present invention is implemented in a fashion which does not disrupt the interface to the Lock Manager. Instead, the internal operation of the Lock Manager—apart from the API—is modified for incorporating method steps of the present invention.

In the presently preferred embodiment, the Lock Manager in the system of the present invention supports the following API.

```
 1: /*
 2: External API's of Lock Manager:
 3: ------------------------------
 4: */
 5:
 6: int
 7: lock_address(int op, int locktype, char * address,
 8:     LOCKHEAD * ctxchain, LOCKREC ** lockrecp);
10: int
11: lock_logical(int op, int locktype, short dbid, objid_t objid,
12: pgid_t pageno, LOCKHEAD * ctxchain, int suffclass,
13:     LOCKREC ** lockrecp);
14:
15: lock_multiple(LOCKREQUEST reqarray[ ], int nlocks);
16:
17: int
```

```
-continued
18: lock_psema(SYB_SEMAPHORE * semaphore, SEMAWAIT * semawait,
19:     LOCKREC ** lockrecp, int flags);
20:
21: void
22: lock_vsema(SYB_SEMAPHORE * semaphore, SEMAWAIT * semawait);
23:
24: void /*not called directly, lock_ctxchain_release( ) used instead*/
25: lm_internal_ctxchain_release(LOCKHEAD * ctx);
26:
27: void
28: lock_release(LOCKREC * lockrec);
29:
30: int
31: lock_wait(LOCKREC * lockrec);
```

The first API call, lock_address at lines 6–8, comprises the API call to "grab" an address lock. The address lock returned is added to a context chain (ctxchain), which comprises a chain of locks which have been queued up. The lock_address API function would be called, for instance, by an internal client which desires to lock an index page in memory.

The next API call, lock_logical at lines 10–13, serves to acquire a logical lock. A logical lock, which can be employed to lock a page or a table, can be held for the duration of a transaction. An address lock, in contrast, is typically held for only a brief period of time; it is not held for the duration of a transaction.

The lock_multiple API call, at line 15, serves to process an array of lock (logical) requests. In operation, lock_multiple calls lock_logical repeatedly, for processing the lock requests. The lock_multiple function returns all the requested locks (together), sleeping if need be for obtaining the requested locks.

The lock_psema API call, at lines 17–19, is employed for a special locking purpose: locking the log page (i.e., the last page of the log). The lock_psema function serves to hold a lock briefly—releasing the held lock at the end of the log operation. The lock_vsema call, at lines 21–22, functions in a similar manner.

The lm_internal_ctxchain_release API call, at lines 24–25, serves to release locks which have been queued up in the context chain. The API call is invoked indirectly through lock_ctxchain_release. The lock_release API call, at lines 27–28, serves simply to release a lock. The particular lock being released is indicated via a lock record which is passed in as a parameter to the function.

On occasion, a requested lock might not be available for granting. Accordingly, the Lock Manager also includes a lock_wait API call, as shown at lines 30–31. In operation, the API call waits on the lock (indicated by the passed in lock record) until the lock is granted. If a client does not receive a lock which it has requested, the client undertakes responsibility for calling lock_wait, for waiting for the lock to be granted. As described in further detail below, only when the system is waiting on a lock will it undertake deadlock searching. In such a case, the Lock Manager invokes the internal function lock_perform_deadlock_search (described below) which performs deadlock searching.

B. Lock Manager data structures

Before describing operation of the Lock Manager API functions in further detail, it is first helpful to describe data structures which are employed by the functions. A first data structure, op (i.e., operation), serves as a flag for indicating a type of lock operation required. This data structure may be constructed simply as an enumerated (integer) type as follows.

```
/*
    Flag parameter values for op.
    Passed to lock_logical, lock_address, and lock_psema
*/
# define LOCK_ACQUIRE   0x0
# define LOCK_NOWAIT    0x1
# define LOCK_RELEASE   0x2
# define LOCK_VERIFY    0x4
# define LOCK_NOQUEUE   0x10
```

LOCK_ACQUIRE is a flag indicating that the operation desired is to acquire a lock. LOCK_NOWAIT is a flag also indicating that a lock should be acquired; however, the flag also indicates that the system should not wait for a lock to be acquired. LOCK_RELEASE is a flag indicating that the operation desired is to release the lock. The LOCK_VERIFY flag indicates that the system should verify a lock—that is, see whether a valid lock exists. LOCK_NOQUEUE is a flag indicating that a lock should be acquired; however, the flag also indicates that if the lock cannot be granted, the request for the lock should not be queued. LOCK_NOWAIT, in contrast, does queue the lock (but does not wait for it to be granted). LOCK_NOQUEUE, on the other hand, indicates that the client does not want the lock if it cannot be obtained immediately.

Different types of locks are available in the system. For logical locks, seven types are provided as follows.

```
/* Lock types for lock_logical */
# define EX_TAB         1
# define SH_TAB         2
# define EX_INT         3
# define SH_INT         4
# define EX_PAGE        5
# define SH_PAGE        6
# define UP_PAGE        7
# define NLOCKTYPES     7
```

The first two lock types, EX_TAB and SH_TAB, indicate an exclusive table lock and a shared table lock, respectively. The next two lock types, EX_INT and SH_INT, indicate an exclusive intent lock and a shared intent lock, respectively. An "intent" lock is employed in the context of acquiring page locks. Here, the client employs the "intent" lock to make sure that the entire table is not locked. In other words, the client employs an intent lock on a table when the client is holding page locks in that table. The page-level locks, EX_PAGE, SH_PAGE, and UP_PAGE, represent an exclusive page lock, a shared page lock, and an update page lock, respectively.

For address locks, the following types are provided.

```
/* Lock types for address locks */
# define EX_ADDR      8
# define SH ADDR      9
```

As shown, two types of locks are provided: an exclusive address lock (EX_ADDR) and a shared address lock (SH_ADDR). The shared address lock is provided so that multiple readers of an object, such as multiple readers scanning the pages of an index, can do so in a shared fashion, thereby avoiding the need for the readers to serialize one after another.

The actual lock is represented by a lock record, LOCK-REC. In an exemplary embodiment, it may be constructed as follows.

```
/*
** LOCKREC
**
** A lockrec identifies a task waiting for a semaphore, and facilitates
** backout by being linked onto the task's global data structures.
**
** NOTE: lockobjs, semawaits, lockrecs, and freelocks are all the
** same size so they can be freed to the same free list.
*/
struct lockrec
{
    /* lrprnext and lrprprev must be first to match up with lockhead */
    struct lockrec   *lrprprev;    /* prev lock on sdes, xdes, or pss */
    struct lockrec   *lrprnext;    /* next lock on sdes, xdes, or pss */
    struct spinlock  *lrspinlock;  /* spinlock for this hash bucket */
    /* lrnext and lrprev must be next to match up with semawait */
    struct lockrec   *lrprev;      /* prev lock on semawait */
    struct lockrec   *lrnext;      /* next lock on semawait */
    spid_t           lrspid;       /* spid of task holding or waiting */
                                   /* spid = server process ID */
    BYTE             lrtype;       /* lock type for logical locks */
    BYTE             lrstatus;     /* lock flags */
    int16            lrsuffclass;  /* sufficiency class */
    int16            lrmagic;      /* "lr" - 0x6c72 */
    struct           semawait *lrsemawait;   /* semawait for these locks */
};
```

As shown, the lock record includes a "previous" pointer (lrprprev) and a "next" pointer (lrprnext), for establishing a linked list of lock records—the "context chain". The context chain exists on a per task basis: given a task, the chain indicates the locks which the task holds. The next set of pointers, lrprev and lrnext, link the lock record to the log manager data structures (i.e., a global representation of the lock). A spin lock for the hash bucket is provided by lrspinlock. This is a new data member which is added for supporting parallel lock management. An identifier representing the task holding or waiting for the lock is stored by lrspid. The next data member, lrtype, stores a lock type for logical locks (e.g., EX_TAB, SH_TAB, EX_INT, SH_INT, and the like).

The lrstatus data member stores status flags for the lock. Exemplary flags include the following.

```
/* Values for 'lrflags'. */
# define LR_NOTWAITING   0x01   /* caller used LOCK_NOWAIT and lock
                                ** manager returned LOCK_DIDNTWAIT.
                                */
# define LR_GRANTED      0x02   /* lockrec is or was at the head
                                ** of the semaphore queue.
                                */
# define LR_MOVED        0x04   /* lockrec was moved to another
                                ** semawait in lock_requeue( ).
                                */
# define LR_UPGRADE      0x08   /* lockrec caused an upgrade */
# define LR_REQUEUE      0x010  /* lockrec could cause a reque */
# define LR_UPGRDDLK     0x020  /* lockrec caused an upgrade deadlock */
```

The LR_NOTWAITING flag indicates that the caller is not waiting (e.g., called with LOCK_NOWAIT). The LR_GRANTED flag indicates that the lock has been granted—the lock record is (or was) at the head of the semaphore queue. The LR_MOVED flag indicates that the lock record (request) was moved (i.e., to another semawait). This indicates that a task went to sleep on a particular semawait but some other task requeued the lock record (request), moving from one semawait to another. Similarly, LR_REQUEUE indicates that a lock record (request) went to sleep on a particular semawait but awoke on another. Here, the "semawait" indicates the position in the queue or line (for granting the lock request). LR_UPGRADE indicates an upgrade of the lock request (to a different level of granularity). The LR_UPGRDDLK flag indicates that the upgrade caused a deadlock.

The next data member of the lock record, lrsuffclass, stores information about the sufficiency of the lock, that is, whether future lock requests for the same task could be covered by the current locks. In other words, this information indicates whether the locks currently held cover the incoming lock request. The lrmagic data member serves as an integrity check for the record. The system can test this value for determining whether the lock record has been corrupted.

The lrsemawait data member stores a pointer to the semawait which can hold multiple lock requests. Recall from the lrprev and lrnext pointers that a lock record can participate on a semawait chain (of lock requests).

C. Lock Manager operation

Operation of the Lock Manager is perhaps best illustrated by example, such as processing of a client request for an address lock. The following example will focus on a single client which takes out a lock on an index page in memory (i.e., an address lock), with particular emphasis on modifications made to the Lock Manager for implementing parallel lock management. Here, one or more index pages had been read from disk into system memory. In order to gain access to one of those pages in memory, the client takes out an address lock.

For this example, the caller or "client" is getindexpage, a routine for locking an index page. The caller, shown in skeletonized form (to focus on the Lock Manager API call), is as follows.

```
 1: /*
 2: **    GETINDEXPAGE
 3: **
 4: **    Traverse an index from parent to the child page given in
 5: **    sdes—>scur. Return a buffer pointer to the kept, rlocked child.
 6: **    This routine is the only way to safely traverse from parent to
 7: **    child in an index. It has a symbiotic relationship with its only
 8: **    caller, srchindex. Getindexpage implements two searching methods
 9: **    based on the ladderlock flag.
10: **
11: **    If 'ladderlock' is TRUE, hold the rlock on the parent while
12: **    reading and rlocking the child. This guarantees the identity of
13: **    the child (because the parent must be updated to split or shink
14: **    the child) , and ensures that progress will be made, but reduces
15: **    index concurrency. With ladder locking, both parent and child
16: **    pages are kept and rlocked on return.
17: **    If 'ladderlock' is FALSE, drop the rlock on the parent before
18: **    rlocking the child, and verify the child's identity by
19: **    rechecking the parent's timestamp (the parent would have to have
20: **    changed for the child's identity to have changed). This scheme
21: **    increases index concurrency because only one rlock is held at a
22: **    time. However, in an index with many splits and/or shrinks, a
23: **    search using this method may never make progress. With this
24: **    method the child is returned kept and rlocked while parent is
25: **    unrlocked and unkept.
26: **    For either case of timestamp locking or ladder locking, if
27: **    a deadlock is detected then we will tolerate this deadlock by:
28: **
29: **    1. If ladder locking then release the parent rlock and wait
30: **       on the child rlock. When get the child rlock, release
31: **       it and return failure to start index search over again.
32: **
33: **    2. If timestamp locking then parent has already been released
34: **       so simple wait on the child and when get it release it and
35: **       return failure and start the index search over again.
36: **
37: **    We wait on the child page and immediately release it to prevent
38: **    thrashing on the index structure.
39: **
40: **    PARAMETERS:
41: **    srchlock_info - Index lock structure holding relevant lock
42: **                    info
43: **    RETURNS
44: **    Pointer to kept buffer for child page, or NULL if the desired
45: **    page could not be obtained for some reason. If NULL is
46: **    returned, then sdes—>sridoff holds:
47: **        sridoff = 0      - Child may have changed identity;
48: **              caller can restart search.
49: **        sridoff = DEADLOCK   - Deadlock obtaining child rlock.
50: **
51: **    SIDE EFFECTS
52: **    If ladder locking, both parent and child are kept and rlocked
53: **    on return. If not ladder locking, parent is unrlocked and
54: **    unkept, and child is rlocked and kept. On error, both parent
55: **    and child are unrlocked and unkept.
56: **    Ex_raise if a page belonging to the wrong object is arrived at.
57: **    Ex_raise if attention condition raised.
58: **
59: **    MP SYNCHRONIZATION:
60: **    The search methods rely on the way that indexes are changed in
61: **    order to guarantee that the search is not misdirected to the
62: **    wrong page. Both methods rely on rlocks being obtained on all
63: **    pages involved in a split or shrink and being held until the
64: **    split or shrink is complete. The timestamp method requires that
65: **    the page timestamp changes be made while the rlocks are held.
66: **
67: */
68: BUF *
69: getindexpage(INDEXLOCK * srchlock_info)
70: {
71:
72: /*    . . . do setup and initialization */
73:
74: /*    . . . check the lock mode (timestamp or ladder locking) */
75:
76: /*    get the page in memory */
77:      /*
78:      ** We do not want a DEADLOCK error to make it back to the client
79:      ** here as we will retry the RLOCK( ) below. Update bp in
80:      ** srchlock_info, so we can cleanup our resources held.
```

```
81:     */
82:     bp = getpage(sdes);
83:     *srchlock_info—>bp = bp;
84:     /*
85:     acquire the appropriate address lock on the page
86:     (shared or exclusive);
87:     */
88:     if (ladderlock)
89:         lockstat = RLOCK_EXCLUSIVE(bp, sdes, srchlock_info—>bplock);
90:     else
91:         lockstat = RLOCK_SHARE(bp, sdes, srchlock_info—>bplock);
92:
93:     /* ... */
94: }
```

At line 72, the routine performs general setup and initialization steps. Then, at line 74, it checks the lock mode, which specifies how a lock is released when traversing from parent to child page. At lines 76–83, the actual page is retrieved in memory, by a call to getpage. At lines 85–91, the Lock Manager is invoked for obtaining an appropriate address lock on the page (either shared or exclusive).

As shown at line 89, the actual call to the Lock Manager is made through a macro, RLOCK_EXCLUSIVE, for ladder locking; otherwise, the call to the Lock Manager is made through the RLOCK_SHARE macro at line 91 (for timestamp locking). These macros, in turn, expand out into calls to the Lock Manager's lock_address API function, as shown by the following macro definitions.

define RLOCK_EXCLUSIVE (bp, sdes, lockrecp)\lock_address (LOCK_ACQUIRE, EX_ADDR, (char *) bp, &sdes→slocks, lockrecp)
define RLOCK_SHARE (bp, sdes, lockrecp)\lock_address (LOCK_ACQUIRE, SH_ADDR, (char *) bp, &sdes→slocks, lockrecp)

For a ladder locking traversal of the index pages, therefore, an exclusive lock is requested by the getindexpage function as follows:

lock_address (LOCK_ACQUIRE, EX_ADDR, (char *) bp, &sdes→slocks, lockrecp)

As shown, the first parameter to the lock_address call specifies a LOCK_ACQUIRE operation. The second parameter indicates the type of lock required, here, an exclusive address lock (EX_ADDR). The address for which the lock is required, the third parameter, is simply the address in memory (i.e., pointer to the index page; here, bp—a buffer). The fourth parameter, slocks, specifies a context chain which the client provides (via the session descriptor, sdes). Here, the session descriptor or sdes includes a slocks member, for storing the address of the lock context chain (i.e., the linked list of lock records).

The lock_address function serves to acquire a lock on a data server address. Typically, the address will correspond to a data structure associated with an object, such as a buffer header. Address locks can be requested in shared or exclusive lock types. Compatibility for these lock types is represented by the following table.

|         | EX_ADDR | SH_ADDR |
|---------|---------|---------|
| FX_ADDR | No      | No      |
| SH_ADDR | No      | Yes     |

As shown, the only compatibility which exists is between two shared address locks. Address locks are granted in the order that they are requested, thereby avoiding "starvation" of exclusive address requests. If there exists multiple readers, for instance, no reader bypasses an exclusive access. This approach leads to increased efficiency of the code (which itself is executed frequently).

In an exemplary embodiment, the lock_address function may be constructed as follows.

```
 1: /*
 2: ** LOCK_ADDRESS
 3: **
 4: ** Acquire a lock ona dataserver address.
 5: ** Generally the address will correspond to a
 6: ** datastructure associated with an object, such as
 7: ** a buffer header.
 8: ** Address locks available in shared or exclusive lock types.
 9: **
10: ** Compatibility table for these two lock types.
11: **
12: **          EX_ADDR    SH_ADDR
13: **
14: ** EX_ADDR    NO         NO
15: **
16: ** SH_ADDR    NO         YES
17: **
18: **
19: ** Address locks are granted in the order that they are
20: ** requested. This avoids starvation of EX_ADDR requests.
21: **
```

```
 22: ** Parameters:
 23: **
 24: ** op      Operation to perform. The following operations are
 25: **    supported:
 26: **
 27: **    LOCK_ACQUIRE    Acquire a lock on the given address.
 28: **
 29: **    The following value can be or'd with LOCK_ACQUIRE:
 30: **
 31: **    LOCK_NOWAIT    Do not sleep if the lock cannot be
 32: **        granted immediately. The caller must then call
 33: **        lock_wait to wait for it.
 34: **
 35: **  locktype   The type of this address lock request.
 36: **               EX_ADDR or SH_ADDR.
 37: **
 38: ** address    An address to lock. Subsequent lockers of this
 39: **      address will have to wait.
 40: **
 41: ** ctxchain      The context chain to which to link the lock.
 42: **
 43: ** lockrecp    A pointer to a pointer to a lockrec, or NULL. If
 44: **      it is non-null, lock_address will fill it in with a
 45: **      pointer to the lock of interest. This may then *only* be
 46: **      passed to lock_wait or lock_release.
 47: **
 48: ** Returns:
 49: **
 50: ** One of these status values is returned:
 51: **
 52: ** LOCK_GRANTED        (+) The lock was granted immediately.
 53: ** LOCK_WAITED         (+) The caller's task had to wait for the lock
 54: **           to be granted. The lock WAS granted.
 55: ** LOCK_DIDNTWAIT      (-) The caller would have had to wait, but
 56: **           LOCK_NOWAIT was specified. Lockrecp was filled
 57: **           in with the lockrec to wait for later.
 58: ** LOCK_DEADLOCK (-) The caller was selected as a deadlock victim.
 59: ** LOCK_INTERRUPTED (-) The lock was not granted because the task
 60: **           received an attention condition while
 61: **           waiting for it.
 62: **
 63: ** MP Synchronization:
 64: ** No explicit synchronization required of the caller. Obtains
 65: ** the spinlock from lock address hash bucket to protect lock
 66: **   states and chains.
 67: **
 68: ** Side Effects:
 69: ** Before we ex_raise an error in this routine we will turn off
 70: ** P2_LOCKRETRY status bit in the pss. We don't have to do the
 71: **   same for each return as the caller of this routine with this
 72: ** status bit set will clear out this bit in the pss.
 73: ** This status bit should only be used by srchindex().
 74: **
 75: */
 76: int
 77: lock_address(int op, int locktype, char * address, LOCKHEAD *
 78:   ctxchain, LOCKREC ** lockrecp)
 79: {
 80:   LOCALPSS(pss);   /* initialize local copy of global pss */
 81:   LOCKOBJ *bucket;   /* hash table overflow chain pointer */
 82:   LOCKOBJ *obj;   /* object we're locking */
 83:   SEMAWAIT *sw;   /* semawait cursor */
 84:   LOCKREC *lr;   /* lockrec cursor */
 85:   int ret;   /* return value */
 86:   SPINLOCK *spinlock;   /* spinlock for the hash chain */
 87:
 88:
 89: /*
 90: ** Hash the address into the address lock hash table. This can
 91: ** be done without the spinlock since we are simply doing an
 92: ** array index.
 93: */
 94:
 95: bucket = LOCK_ADDR_HASH(address);
 96: spinlock = ((HASHLOCKHEAD *) bucket)->hlhspinlock;
 97:
 98: /*
 99: ** Before getting the spinlock for the hash chain, make sure
100: ** there this task has enough locks cached. If not, get some
101: ** more from the shared free list.
```

```
102: */
103: if (Eresource->erfreelock_cache.fcfreelocknum < MINLOCKSTRUCTS)
104: {
105:   lock__fillcache();
106: }
107:
108: /*
109: ** Get hash bucket spinlock in order to search chains and
110: ** guarantee contents and identity of the data structures. It
111: ** won't be released until this routine returns.
112: */
113:
114: P_SPINLOCK(spinlock);
115:
116: /*
117: ** Look for the object on the hash overflow chain.
118: */
119:
120: for (obj = (LOCKOBJ *) bucket->lonext; obj != (LOCKOBJ *) bucket;
121:   obj = obj->lonext)
122: {
123:   if (obj->loobjidpageno == (long) address)
124:   break;
125: }
126:
127: /*
128: ** Allocate a lockobj if there wasn't one in the hash
129: ** table already, and link it onto the hash chain.
130: ** This provides a head (semaphore) to chain waiters from.
131: */
132: if (obj == (LOCKOBJ *) bucket)
133: {
134:   /* Allocate and link onto hash table. */
135:   LOCK__ALLOC_LOCKOBJ(Eresource->erfreelock_cache, obj);
136:
137:   /* Identify the object. */
138:   obj->loobjidpageno = (long) address;
139:
140:   /* Link to the hash table */
141:   LINK_TO_HASHTABLE(bucket, obj, spinlock);
142: }
143:
144: /*
145: ** Allocate a semawait, initialize it, and link it to
146: ** the tail of the semaphore queue.
147: ** Allocation of the new semawait will be done when any one of
148: ** the following conditions is true:
149: **
150: ** 1) Request is for an exclusive address lock.
151: ** 2) Request is for a shared address lock but the semawait queue
 for
152: **    the lock object is empty.
153: ** 3) Request is for a shared address lock but the last semawait in
154: **    the semawait queue for the lock object is for an exclusive
155: **    address lock.
156: **
157: ** Note that condition 3) maintainss the FIFO order of address
158: ** lock requests and avoids starvation.
159: **
160: */
161: if ((locktype == EX_ADDR) ||
162:   ((obj->losemaphore.smtail == (SEMAWAIT *)obj) ||
163:    (obj->losemaphore.smtail->swlhead->lrtype == EX_ADDR)))
164: {
165:   LOCK__ALLOC_SEMAWAIT(Eresource->erfreelock cache, sw);
166:   sw->swstatus = 0;
167:   sw->swspinlock = spinlock;
168:   LINK_TO SEMAPHORE(&obj->losemaphore, sw);
169: }
170: else
171: {
172:   /*
173:   ** This is a shared lock request and one of the following
174:   ** conditions is true:
175:   ** 1) The last waiter is also a shared lock request.
176:   ** 2) All the current owners are shared mode owners and there
177:   **    is no waiter. Note that there would only be one semawait
178:   **    in the queue in this case.
179:   ** In either case we do not have to allocate a new semawait. We
180:   ** can just queue the current request to the last semawait in
```

```
181:    ** the queue.
182:    */
183:    sw = obj->losemaphore.smtail;
184: }
185: /* Allocate a lockrec, initialize it,
186:    and link it to the semawait. */
187: LOCK___ALLOC_LOCKREC(Eresource->erfreelock_cache, lr);
188: lr->lrspid = pss->pspid;
189: lr->lrstatus = 0;
190: lr->lrtype = locktype;
191: lr->lrsuffclass = LOCKSUFFCLASS_NONE;
192: LINK_TO_SEMAWAIT(sw, lr, spinlock);
193:
194: /* Sdes's sometimes get cleared. This would make the context chain
195: ** invalid, since it's supposed to point to itself when empty.
196: ** If we detect a cleared-out context chain, presume it's tneant to
197: ** be empty and re-initialize it. Obviously it would be better
198: ** to fix sdes management, but that's not too easy.
199: */
200: if (ctxchain->lhhead == 0)
201:    MKPSSLKHD( (*ctxchain));
202:
203: /* Link the lock to the context chain */
204: LINK TO_LOCKHEAD(ctxchain,.lr);
205:
206: /*
207: ** The lock has been created and found it's place in line,
208: ** now see what to do about it.
209: */
210:
211: /* Lock is at the head of the queue; grant it immediately. */
212: if (sw == obj->losemaphore.smhead)
213: {
214:   if (lockrecp)
215:     *lockrecp = lr;
216:     lr->lrstatus |= LR_GRANTED;
217:     V_SPINLOCK(spinlock);
218:     return(LOCK_GRANTED);
219: }
220:
221: /* Caller has to wait but doesn't want to, at least now. */
222: if (op & LOCK_NOWAIT)
223: {
224:   if (lockrecp)
225:     *lockrecp = lr;
226:   /* Mark the lockrec so we can tell that even though
227:   ** the semawait is not at the head of the queue, this task
228:   ** still won't be waiting for it (until it calls lock wait)
229:   */
230:   lr->lrstatus |= LR_NOTWAITING;
231:   V_SPINLOCK(spinlock);
232:   return(LOCK_DIDNTWAIT);
233: }
234:
235: /* Otherwise, wait for the lock. Lock_semawait
236: ** releases the spinlock.
237: */
238: ret = lock_semawait(sw, lr);
239:
240: if (lockrecp)
241:   *lockrecp = (ret == LOCK_WAITED ? lr : 0);
242:
243: return (ret);
244: }
```

The steps of the function are as follows. Local (stack) variables are declared initially, at lines 80–86. At lines 89–96, the function hashes the passed-in address into an address lock hash table. This yields a particular "bucket." Here, the bucket is protected by a spinlock; at line 96, this spinlock is grabbed. At lines 98–106, the function checks to make sure that the current task has enough locks cached. If not, more locks will be obtained from a shared/global freelist of locks.

At lines 106–114, the spinlock is asserted, thereby assuring exclusive access to the hash bucket (for guaranteeing contents and integrity of the data structures). The spinlock will be held until termination of the routine. At lines 116–125, the function looks for the object(s) which hang off the hash bucket (i.e., hash overflow chain). If the address (for the address lock) already exists in the hash bucket, an address lock has already been taken out for that object. If the address is not found there, then the current request is the first lock request for the bucket, for that particular address. At lines 127–142, a lock object is allocated (if one does not already exist in the hash table) and is linked into the hash chain. This provides a head (semaphore) in which "waiters" (i.e., those waiting for lock requests to be granted) can be chained from. The locked object is linked to the hash table using a macro, as shown specifically at line 141.

At lines 144–184, the function allocates a semawait, initializes it, and links it to the tail of the semaphore queue. Allocation of the new semawait occurs when:

(1) Request is for an exclusive address lock;

(2) Request is for a shared address lock but the semawait queue for the lock object is empty; or (3) Request is for a shared address lock but the last semawait in the semawait queue for the lock object is for an exclusive address lock.

These conditions are specifically tested at lines 161–163.

An exclusive address lock has the property that there will exist only one lock record per semawait. In other words, a semawait will be allocated and an address lock will be allocated. If, on the other hand, the lock type is shared, multiple lock records or objects can be hanging off one semawait. Lines 161–163 specifically test if the locktype is an "exclusive address" type, or there exists no SEMAWAIT in the object (i.e., the object is linked to itself—no other SEMAWAIT is hanging off), or the head is equal to EX_ADDR. If any of these conditions hold true, then a new SEMAWAIT is allocated (line 165) and linked in (line 168). Otherwise, the function uses the tail semawait. Here, the tail semawait already has a shared address lock and the incoming lock is a shared address lock, which can be queued to the tail.

At lines 168–192, a lock record or object is initialized and linked to the semawait. Additionally, the status flag is cleared (line 189); the lock type is set equal to the requested locktype (line 190); and the sufficiency is set equal to none (line 191). Here, only logical locks have a sufficiency class; accordingly, address locks set the sufficiency class variable to none.

At lines 194–204, the lock record is linked into the context chain. However if no context chain exists (tested at line 200), a new context chain is allocated (line 201). At lines 211–219, the lock is granted immediately if the function detects that the lock is at the head of the queue. The status flag is upgraded to "granted," at line 216. The spinlock is released at line 217, and the method returns, at line 218, with the result of LOCK_GRANTED. If the lock is not granted at this point (i.e., the test at line 212 reveals that the request is not at the head of the queue), then the lock request must wait.

How the method terminates at this point depends on whether the caller, when invoking the function, indicated that it wanted to wait for the lock request to be granted. If the caller does not want to wait (i.e., operation is LOCK_NOWAIT), then the lock record is marked (line 225), the status flag is set to "not waiting" (line 230), the spinlock is released (line 231), and the function returns a result of LOCK_DIDNTWAIT (line 232). Marking the lock record allows the task to later call $lock_{13}$ wait, to wait for the lock.

If the caller did not specify a "no wait" operation, then the function will wait for the lock by calling lock_semawait, at line 238. This represents a common case. At this point, the task sleeps on the lock. When the call to lock_semawait returns, the return result is stored in a local variable (ret), at line 238. In turn, the result is returned to the caller to lock_address at line 243, whereupon the function is done.

Deadlock searching

A. Overview

Deadlock search can be initiated either at the time of waiting for a lock, or can be deferred for a later time. Here, deferred deadlock detection represents an optimization in the system of the present invention. In such a case, a lock can be granted without undertaking deadlock detection. The point at which the system waits on a lock is the point where the system decides whether to undertake deadlock detection (i.e., before going to sleep on the lock) or deferred detection until a later time. If the deadlock checking is deferred for a later time then a mechanism is needed to initialize the search at the later time. This is initiated by an alarm handler routine. The frequency of deadlock checking is configurable by adjusting a user-settable deadlock checking period configuration parameter.

The search method detects deadlocks by detecting cycles in a directed dependency graph amongst the tasks waiting for locks. In this graph there would be a directed edge from task A to task B if task A was waiting for a lock that task B owns. The dependency graph is not explicitly created by the method. The method actually represents only the nodes in the graph in a list called "sleeping owners list." The edges are implicitly represented through recursion of the method.

The deadlock search method employs a global sequence number and a queue. The global sequence number is called a "lock wait sequence number." This sequence number is initialized at server start-up time and incremented whenever a task has to wait for a lock. The sequence number is incremented under LOCK_SLEEPTASK_SPIN spinlock by the task which has to wait for its lock request. The queue, on the other hand, is called a "lock_sleeptask queue." Each task which has to wait for a lock adds an entry to lock_sleeptask_queue. Once the lock is granted, the task will remove its entry from this queue. The queue comprises one or more "sleeptask" records. Each record describes the sleeping task. It stores the semawait on which the task is sleeping along with the lock wait sequence number at the time it went to sleep. Lock wait sequence number will change when the task initiates a deadlock search.

The access to this queue is serialized by LOCK_SLEEPTASK_SPIN spinlock. Each entry in the lock_sleeptask_queue has a sequence number field. When a task adds an entry to the sleeptask queue, it stores the current value of the global lock wait sequence number in the sequence number field of the entry. The task then increments the global lock wait sequence number while holding the LOCK_SLEEPTASK_SPIN spinlock. An array called dlscurrent_path is used to record tasks visited in the path from the initiator of the search to the current task.

Deadlock search is initiated by the task which has to wait for a lock. The search method proceeds by creating a list of tasks which own this lock and which are waiting for some other lock. This list is the "sleeping owners list." The search method repeats recursively for each task in the sleeping owners list. A deadlock is detected when the method encounters the initiator of the search as a sleeping owner (at some level of recursion).

Spin locks are held only while creating the sleeping owners list. The relevant bucket spinlock is held while traversing the list of granted lockrecs on the head semawait to record all the sleeping owners of the lock. Then LOCK_SLEEPTASK_SPIN (spin lock) is held while ascertaining that the recorded owners are indeed sleeping even after the release of the bucket spinlock.

Since the deadlock search holds only the spinlock corresponding to one hash bucket at a time, lock operations can proceed on other hash buckets. In other words, the method allows the dependency graph to change while the deadlock search is in progress. As a result, new dependency edges might form and old edges might be deleted as the search is traversing the dependency graph. For correctness of the search, the search method restricts the traversal to dependency edges that were formed since the search started. Any cycles formed because of new edges are detected by later searches initiated by the tasks which created the edges. The sequence number on the lock_sleeptask_queue is used to detect and discard edges that were formed after the search started. Any entry added to the queue after the search started has a sequence number greater than the sequence number when the deadlock search started.

The deadlock search method does not resolve deadlocks which do not involve the initiator of the search. In the currently preferred embodiment, the method detects up to two cycles involving the initiator. The search is stopped after determining that the initiator is involved in two deadlocks. This is primarily to limit the cost of search.

B. Detailed operation of deadlock searching

During system operation, a queue of tasks exists which are sleeping on locks. Deadlocks can only happen among tasks which are sleeping. Thus, these tasks are the only candidates for performing deadlock searching. Accordingly, the deadlock search method of the present invention exploits this feature for implementing its approach.

1. lock_semawait

At a high level, a given task invokes the lock_semawait function for waiting until either a semaphore (semawait) is granted or until the task is chosen as a deadlock victim. In an exemplary embodiment, the lock_semawait function may be constructed as follows.

```
 1: /*
 2: **   LOCK_SEMAWAIT
 3: **
 4: **   Wait for a semaphore until it is granted or the current process is
 5: **   chosen as a deadlock victim.
 6: **
 7: **   The caller has determined that the semawait is not at the head of
 8: **   its semaphore queue. The caller should also be aware that upon
 9: **   return of this routine the semawait passed in may no longer be
10: **   valid. DO NOT USE IT AFTER THIS ROUTINE HAS BEEN CALLED.
11: **
12: **   This routine performs either deferred deadlock search or
13: **   non-deferred deadlock search. Decision to perform deadlock search
14: **   is based on the configuration parameter "deadlock checking
15: **   period". If this is zero, the task attempts to perform deadlock
16: **   checking before going to sleep on the lock.
17: **
18: **   Parameters:
19: **      semawait  - the semawait to wait for
20: **      lockrec   - the lockrec to wait for
21: **
22: **   Returns:
23: **      LOCK_WAITED       (+) The caller's task had to wait for the lock to
24: **           be granted. The lock WAS granted.
25: **      LOCK_DEADLOCK     (-) The caller was selected as a deadlock victim.
26: **      LOCK_INTERRUPTED  (-) The lock was not granted because the task
27: **           received an attention condition while
28: **           waiting for it.
29: **
30: **   MP Synchronization:
31: **      Assumes caller holds hash bucket spinlock, but this routine
32: **      always releases it before returning.
33: **      This routine acquires LOCK_SLEEPTASK_SPIN spinlock to add an entry
34: **      to the lock sleeptask queue and to increment the lock wait
35: **      sequence number.
36: **   Side effects:
37: **      If the task has to wait, the global lock wait sequence number is
38: **      incremented. If the current value of global lock wait sequence
39: **      number is unsafe to compare with the oldest sequence number in the
40: **      lock sleeptask queue, the lock sleep task queue entries are
41: **      reinitialized with the current value. If the task is woken up to
42: **      perform deadlock search, it will wake up the next task to perform
43: **      deadlock search after finishing its deadlock search. This routine
44: **      might cause the current process to schedule out.
45: */
46: int
47: lock_semawait(SEMAWAIT * semawait, LOCKREC * lockrec)
48: {
49:    LOCALPSS(pss);          /* initialize local copy of global pss */
50:    SEMAWAIT    *event = 0;
51:    SPINLOCK    *spinlock;
52:    circ_long lockwait_seqno; /* store current value of global seqno */
53:    int16       ststatus;   /* status of lock sleeptask queue entry */
54:    SYB_TIMEVAL cur, sav, res; /*used for lock sleep stats, flag 1203*/
55:    uint32      millisecs;
56:
57:    spinlock = semawait->swspinlock;
58:    SPINLOCKHELD(spinlock);
59:
60:    /*
61:    ** Check if we would sleep on this semaphore. If we would then
62:    ** we might need to do deadlock search. We would wait on this
```

```
63:    ** semaphore only if it is not at the head of the semawait queue.
64:    */
65:    if (semawait—>swsemaphore—>smhead != semawait)
66:    {
67:        /* Initialization */
68:
69:        /* Release spinlock as we are goin to sleep */
70:        V_SPINLOCK(spinlock);
71:
72:
73:        /*
74:        ** Add an entry to the lock sleep task queue after incrementing
75:        ** current lock wait sequence number. This ordering is IMPORTANT!
76:        ** Deadlock search depends on the fact that the lock wait sequence
77:        ** number is incremented before recording it in the lock sleep
78:        ** task entry. This value in the entry is used to punt the task in
79:        ** deadlock seach.
80:        */
81:        P_SPINLOCK(LOCK_SLEEPTASK_SPIN);
82:        lockwait_seqno = CIRCLE_NEXT(Resource—>rdlc_lockwait_seqno);
83:        LOCK_INIT_SLEEPTASK(pss, semawait, lockwait_seqno);
84:        INSQTAIL(&Resource—>rlocksleeptaskq, pss—>plocksleepq_entry);
85:
86:        /*
87:        ** Determine if we are in deferred or non-deferred
88:        ** deadlock detection mode.
89:        */
90:        if (Resource—>rcdlcheck_period != 0)
91:        {
92:            /*
93:            ** We can defer deadlock checking until later!
94:            ** Just release the sleep task spinlock.
95:            */
96:            V_SPINLOCK(LOCK_SLEEPTASK_SPIN);
97:        }
98:        else
99:        {
100:            /*
101:            ** We need to do deadlock checking now!
102:            ** Only one deadlock search is allowed at a
103:            ** time. This task will initiate deadlock search
104:            ** only if no other deadlock search is in progress.
105:            **
106:            ** Update the iteration count such that when the current
107:            ** deadlock search finishes, it will wake us up to do
108:            ** deadlock search.
109:            */
110:            Resource—>rdlc_iteration_count = lockwait_seqno;
111:
112:            if ( ! (Resource—>rdlc_inprogress))
113:            {
114:                /*
115:                ** We can do deadlock search now. Since splds are non-zero,
116:                ** value of the flag is set to the tasks spld. This can be
117:                ** used as a debugging aid to discover which was the last task
118:                ** to perform deadlock search.
119:                */
120:                Resource—>rdlc_inprogress = pss—>pspid;
121:                pss—>plocksleepq_entry—>ststatus |= STDLSDONE;
122:
123:                /*
124:                ** Decrement the count of tasks which have not yet done
125:                ** deadlock search.
126:                */
127:                Resource—>rdlc_dlsnotdone_count--;
128:
129:                /*
130:                ** Reinitialize the sequence numbers in the lock sleep task
131:                ** queue if the current sequence number cannot be compared
132:                ** safely with the oldest sequence number in the lock
133:                ** sleeptask queue. Since the lock sleeptask queue is ordered
134:                ** on sequence number, the oldest value in the queue would be
135:                ** at the head of the queue.
136:                */
137:                if (!CIRCLE_SAFE(
138:                    ((SLEEPTASK *) (QUE_NEXT(&Resource—>rlocksleeptaskq)))
139:                        —>stsequence_number,
140:                        lockwait_seqno))
141:                {
142:
```

-continued

```
143:                LOCK_REINITIALIZE_STSEQNO(lockwait_seqno);
144:            }
145:            V_SPINLOCK(LOCK_SLEEPTASK_SPIN);
146:            /*
147:            ** Perform deadlock search and victim cleanup.
148:            ** Routine returns LOCK_DEADLOCK if there was a
149:            ** deadlock and we were the victim.
150:            */
151:            if (lock_perform_deadlock_search (semawait, lockrec)
152:                == LOCK_DEADLOCK)
153:                return LOCK_DEADLOCK;
154:        }
155:        else
156:        {
157:            /*
158:            ** We are in non-deferred mode, but a deadlock search is
159:            ** in progress. So defer the search until the current search
160:            ** finishes.
161:            */
162:            V_SPINLOCK(LOCK_SLEEPTASK_SPIN);
163:        }
164:      }
165:   }
166:   else
167:   {
168:      /*
169:      ** The semawait is at the head! Our lock must have been granted by
170:      ** now.
171:      */
172:      V_SPINLOCK(spinlock);
173:   }
174:
175:   /* Save the current time in this task's pss. */
176:   P_SPINLOCK(RDATETIME_SPIN);
177:   pss—>pblocktime.dtdays = Resource—>rdate;
178:   pss—>pblocktime.dttime = Resource—>rtime;
179:   V_SPINLOCK(RDATETIME_SPIN);
180:
181:   /*
182:   ** Sleep for the semaphore. It is not necessary to obtain the
183:   ** hash bucket spinlock again since there is one wakeup per
184:   ** semawait; when this task wakes up, our caller will obtain
185:   ** the hash bucket spinlock if necessary.
186:   ** However, there could be a late wakeup from a previous use
187:   ** of this semawait. So we have to sleep until the pwaitsema
188:   ** field in the pss is cleared.
189:   */
190: sleepfor_lock:
191:
192:   /* Increase this task's priority. This is because once
193:   ** the lock is released, the first task on the queue owns
194:   ** it, even while it's asleep. Increasing the priority
195:   ** here means the task will run sooner once it's granted
196:   ** the lock. Running sooner hopefully means it will
197:   ** release the lock sooner, decreasing lock contention.
198:   */
199:   (void) uppri(-1);
200:
201:   /* Wait for the lock. To avoid race conditions with both
202:   ** normal lock releases and deadlock wakeups via uppwakeup,
203:   ** the PL_SLEEP bit is set in the plockstat field instead of using
204:   ** the SEMA_WAITING bit in the semawait.
205:   */
206:   (void) upsleepgeneric(SYB_EVENT_STRUCT(semawait),
207:            (char *) &pss—>plockstat, sizeof(pss—>plockstat)
208:            (long) PL_SLEEP, 1);
209:
210:   /* Restore priority now that we've woken up. */
211:   (void) uppri(1);
212:
213:
214:   /*
215:   ** Check to see if lockrec was moved to another semawait
216:   ** while we were sleeping. This could happen if lock_regueue( )
217:   ** was called. For details see the prologue of
218:   ** lock_requeue( ) and the code section where we set the bit.
219:   */
220:   P_SPINLOCK(spinlock);
221:   if (lockrec—>lrstatus & LR_MOVED)
222:      semawait = lockrec—>lrsemawait;
```

```
223:
224:     /*
225:     ** There are four reasons for us to wake up from
226:     ** sleep:
227:     ** 1. We got the lock! In this case we get out in a hurry.
228:     ** 2. We were woken up because of an attention.
229:     ** 3. We were woken up to initiate deadlock search. In this
230:     **    case we have to initiate deadlock search.
231:     ** 4. We were selected as a deadlock victim. In this case we
232:     **    need to cleanup state and return with LOCK_DEADLOCK status.
233:     ** We will handle each of these conditions in order.
234:     */
235:
236:     /* We got the lock. */
237:     if ( lockrec—>lrstatus & LR_GRANTED)
238:     {
239:        /* We can release the spinlock now. */
240:        V_SPINLOCK(spinlock);
241:        /*
242:        ** At this point this task should own the semaphore, and the
243:        ** semawait should be at the head of the queue. If this is
244:        ** true, neither the swstatus field nor the semaphore head
245:        ** pointer can change, even though this task doesn't hold the
246:        ** hash bucket spinlock. This sanity test is the bottom line
247:        ** for correct operation of the lock manager so it's left in
248:        ** even if SANITY isn't defined.
249:        */
250:        if ((semawait—>swstatus & SEMA_WAITING)
251:           || semawait—>swsemaphore—>smhead != semawait)
252:        {
253:           ex raise(LOCKM, LKPREMATUREWAKE, EX_CMDFATAL, 1);
254:        }
255:
256:        goto gotlock;
257:     }
258:
259:     /*
260:     ** See if our sleep may have been interrupted.
261:     */
262:     if ((PSS_GOT_ATTENTION(pss)) || (pss—>pstat & P_KILLYOURSELF))
263:     {
264:        /*
265:        ** If we are here, it means that the lock has not been granted
266:        ** yet. This is because we checked whether the lock was
267:        ** granted before checking for attention and we have not yet
268:        ** released the spinlock. All that remains to be done is to
269:        ** cleanup and return with LOCK_INTERRUPTED status.
270:        */
271:
272:        /* Release lockrec and mark the task as not waiting for lock. */
273:        pss—>pwaitsema = 0;
274:        event = lock_unlink(lockrec);
275:        V_SPINLOCK(spinlock);
276:
277:        if (event)
278:           (void) upwakeup(SYB_EVENT_STRUCT(event));
279:
280:        /* Drain the freelock cache if necessary */
281:        CHECKFREELOCKCACHE_OVERFLOW (Eresource—>erfreelock_cache,
282:                   Resource—>rcmaxfreelock_engine);
283:
284:        /* Remove lock sleep queue entry */
285:        P_SPINLOCK(LOCK_SLEEPTASK_SPIN);
286:        LOCK_DELETE_SLEEPTASK(pss, ststatus);
287:        /*
288:        ** Pick the next task to perform deadlock search if we were to
289:        ** have initiated a deadlock search now.
290:        */
291:        if (ststatus & STCHECKDEADLOCK)
292:        {
293:           /* This routine will release LOCK_SLEEPTASK_SPIN */
294:           lock_check_timeout(LOCK_CONTINUE_STQSCAN);
295:        }
296:        else
297:        {
298:           V_SPINLOCK(LOCK_SLEEPTASK_SPIN);
299:        }
300:
301:        return(LOCK_INTERRUPTED);
302:     }
```

```
303:
304:    /* Check if we were woken up to perform deadlock search */
305:    if ((pss—>plocksleepq_entry—>ststatus & STINUSE) &&
306:        (pss—>plocksleepq_entry—>ststatus & STCHECKDEADLOCK ))
307:    {
308:      /*
309:      ** We need to initiate deadlock search.
310:      ** First release the bucket spinlock
311:      */
312:      pss—>plockstat |= PL_SLEEP
313:      V_SPINLOCK(spinlock);
314:
315:      P_SPINLOCK(LOCK_SLEEPTASK_SPIN);
316:      /*
317:      ** Initiate deadlock search!
318:      */
319:      pss—>plocksleepq_entry—>ststatus &= ~STCHECKDEADLOCK ;
320:      /*
321:      ** Alarm handler might wakeup a task which has already
322:      ** completed deadlock search. So scan the queue for a task
323:      ** which needs to perform deadlock search.
324:      */
325:      if (pss—>plocksleepq_entry—>ststatus & STDLSDONE)
326:      {
327:        lock_check timeout(LOCK_CONTINUE_STQSCAN);
328:
329:        /* Go back to sleep on semawait */
330:        goto sleepfor_lock;
331:      }
332:      /*
333:      ** Update the sequence number in pss so that the most
334:      ** recent version of the dependancy graph is checked for cycles.
335:      ** Also increment the global sequence number so that any sleep
336:      ** task entry added after the search starts would have a higher
337:      ** sequence number than the initiator and hence would not be part
338:      ** of the search.
339:      */
340:      lockwait_seqno = CIRCLE_NEXT(Resource—>rdlc_lockwait_seqno);
341:      /*
342:      ** Reinitialize the sequence numbers in the lock sleep task
343:      ** queue if the current sequence number cannot be compared
344:      ** safely with the oldest sequence number in the lock
345:      ** sleeptask queue. Since the lock sleeptask queue is ordered
346:      ** on sequence number, the oldest value in the queue would be
347:      ** at the head of the queue.
348:      */
349:      if (!CIRCLE_SAFE(
350:          ((SLEEPTASK *) (QUE_NEXT (&Resource—>rlocksleeptaskq)))
351:            —>stsequence_number,
352:          lockwait_seqno))
353:      {
354:        LOCK_REINITIALIZE_STSEQNO(lockwait_seqno);
355:      }
356:      pss—>plocksleepq_entry—>stsequence_number = lockwait_seqno;
357:      pss—>plocksleepq_entry—>ststatus |= STDLSDONE;
358:      Resource—>rdlc_dlsnotdone_count--;
359:      V_SPINLOCK(LOCK_SLEEPTASK_SPIN);
360:      /*
361:      ** Routine returns LOCK_DEADLOCK if there was a
362:      ** deadlock and we were the victim.
363:      */
364:      if (lock_perform_deadlock_search (semawait, lockrec)
365:          == LOCK_DEADLOCK) {
366:        return LOCK_DEADLOCK;
367:      }
368:      else
369:      {
370:        goto sleepfor_lock; /* go back to wait on lock */
371:      }
372:    }
373:
374:    /* See if we were a deadlock victim. */
375:    if (pss—>plockstat & PL_DEADLOCKED)
376:    {
377:      lock_cleanup_self (lockrec, FALSE);
378:      return(LOCK_DEADLOCK);
379:    }
380:
381:    /* Release bucket spinlock */
382:    V_SPINLOCK(spinlock);
```

```
383:        goto sleepfor_lock;
384:
385:   gotlock:
386:
387:
388:        /*
389:        ** We would get here only if we own the semaphore!
390:        ** Release the sleep task structure.
391:        */
392:        if (pss—>plocksleepq_entry—>ststatus & STINUSE)
393:        {
394:           P_SPINLOCK(LOCK_SLEEPTASK_SPIN);
395:           LOCK_DELETE_SLEEPTASK(pss, ststatus);
396:           if (ststatus & STCHECKDEADLOCK)
397:           {
398:              /* This routine will release LOCK_SLEEPTASK_SPIN */
399:              lock_check timeout(LOCK_CONTINUE_STQSCAN);
400:           }
401:           else
402:           {
403:              V_SPINLOCK(LOCK_SLEEPTASK_SPIN);
404:           }
405:        }
406:
407:        return(LOCK_WAITED);
408:   }
```

Before calling the lock_semawait function, the caller has determined that the semawait is not at the head of its semaphore queue (otherwise, the lock is granted). As shown, the function is invoked with the semaphore to wait for and the lock record to wait for. As shown at lines 22–28, the function can return a result value or flag of LOCK_WAITED, LOCK_DEADLOCK, or LOCK_INTERRUPTED. LOCK_WAITED indicates that the lock which the task had to wait for was granted. LOCK_DEADLOCK indicates that the caller (process) was selected as a deadlock victim. LOCK_INTERRUPTED indicates that the lock was not granted and that the task was "interrupted" while waiting for the lock. In such a case, the caller must return at some later point in time for the lock, or it can relinquish its request for the lock altogether.

The steps of the function are as follows. At line 57, the spinlock stored by the semawait is copied to a local variable, spinlock. At line 58, the function tests whether the spinlock is held (since the caller is expected to invoke this function with the spinlock held). At line 65, the function tests whether the semawait is at the head of the queue. Here, the task will only wait on the semaphore if it is not at the head of the semawait queue. As previously described, if it is at the head, then the lock has been granted (i.e., it does not need to wait). If the condition does not hold true (i.e., the semaphore is not at the head), the function knows that it has to sleep on the semaphore. Accordingly, the spinlock is released, at lines 69–70. After it has decided that it is going to sleep, the function adds an entry to the lock sleep task queue—a representation of all the tasks that are sleeping in the system for some lock, at lines 73–84. Specifically, the function grabs a sequence number (line 82) and initializes the sleep task structure (line 83).

The sleep task structure itself is constructed as follows.

```
typedef struct sleeptask
{
  LINK       stqueue;       /* Link to the sleep task queue */
  struct pss    *stpss;     /* back link to the pss of the sleeping task */
  struct semawait    *stsemawait;      /* semawait task is sleeping on */
  circ_long stsequence_number; /* current value of lock wait sequence
  number */
  long       stunused1;          /* Filler to match up with the magic */
  int16      ststatus;           /* deadlock search status */
  int16      stmagic;            /* "st" - 0x5354 */
#if   HAVE_INT64
  int32      stunused3;
#endif   /* HAVE_INT64 */
  long       stunused4;
#if USE_NATIVE_TASKING
  syb_event_t event;
#endif /* USE_NATIVE_TASKING */
}SLEEPTASK;
/*
 Status bits for the sleep task entry.
*/
# define STDLSDONE 0x01         /* Deadlock search has been done for this
                                   lock request once. */
# define STCHECKDEADLOCK    0x02    /* Task has to initiate deadlock search.
*/
# define STINUSE         0x04    /*    Pss—>pstentry    is in use */
```

Use of the structure is as follows. Each task is associated with one instance of the sleep task structure or record. Specifically, a task can only sleep on one lock at a time. In essence, the sleep task structure serves as a descriptor for a particular sleep on a lock. The sleep task structure or record is inserted into the sleep task queue, at line 84.

Once the sleep task record structure is inserted into the sleep task queue, the function determines whether to perform deferred or non-deferred deadlock detection. If the detection can be deferred (tested at line 90), the function releases the sleep task spinlock (line 96) and then goes to sleep. In a preferred embodiment, deferred detection is the default mode. Otherwise (i.e., "false" at line 90), the function proceeds to perform deadlock detection.

Before actually undertaking deadlock detection, the function must first ascertain whether another task is currently performing deadlock detection. In the preferred embodiment, only one task at a time can do deadlock detection. If another task is doing deadlock detection, the current task falls back to the deferred mode of deadlock detection. The specific check for whether deadlock detection is currently in progress is performed at line 1 12. The fall back to deferred mode occurs in the "else" statement at lines 155–163. If deadlock searching is not in progress (i.e., "true" at line 112), then the function proceeds to line 114. Now, the function can initiate deadlock searching. After initial housekeeping (e.g., setting the "in progress" flag at line 120), the function calls a high-level deadlock search routine—lock_perform_deadlock_search—at line 151. If a deadlock is in fact detected, the call will return a result of LOCK_DEADLOCK, at line 153.

With deferred mode deadlock detection, the task initially sleeps before undertaking deadlock detection. When it awakens, it determines the "reason" why it woke up. The task may awaken for one of the following reasons:

(1) The lock was granted;

(2) The task was interrupted (i.e., because of another matter requiring "attention");

(3) The task was awakened to initiate a deadlock search; or (4) The task was selected as a deadlock victim.

Accordingly, the function will test for these conditions.

At line 237, the function tests whether the lock was granted, by testing the status flag for LR_GRANTED. If the condition holds "true," the function releases the spinlock (line 240) and goes to the "gotlock" label at line 256, thereby bypassing the other tests. The function tests at line 262 whether the task was awakened because of an interrupt or "attention" condition. Here, the lock has not been granted. Therefore, the function performs cleanup, including releasing the spinlock (275) and removing the sleep task structure (line 286), before returning LOCK_INTERRUPTED, at line 301.

At lines 305–306, the function tests whether the task was awakened to perform deadlock search. In this case, the task has deferred undertaking the search until it is awakened. Recall for the non-deferred deadlock search, on the other hand, the task undertakes deadlock search before sleeping or waiting. When a task is awakened from its sleep to undertake deadlock searching (i.e., "true" at lines 305–306), deadlock searching is initiated as follows. At lines 308–313, the function releases the bucket spinlock. A "deadlock" status flag is set at line 319. Then, after further initialization/housekeeping, the function invokes the deadlock search subroutine, lock_perform_deadlock_search, at line 364. If a deadlock is detected, LOCK_DEADLOCK is returned by the routine and is, in turn, returned by the lock_semawait function, at line 366. Otherwise (i.e., no deadlock detected), the task goes back to waiting or sleeping on the lock, as indicated by line 370.

At line 375, the function tests for the fourth condition— the task is a deadlock victim. When this condition holds true (i.e., "true" at line 375), the function performs lock cleanup (line 377) and returns LOCK_DEADLOCK, at line 378.

In the event that the task got a lock (e.g., as was shown for the "lock granted case," lines 263–257), the function proceeds to the gotlock label, shown at line 385. Here, the function "passes the baton" from one task to another. Recall that only one task at any given time can perform deadlock searching. The sleep task spinlock is released, at lines 398–399. Finally, the function returns LOCK_WAITED, at line 407, since this represents a case where the lock was granted after waiting.

2. lock_perform_deadlock_search

In an exemplary embodiment, the lock_perform_deadlock_search function may be constructed as follows.

```
 1:   /*
 2:   ** LOCK__PERFORM_DEADLOCK_SEARCH
 3:   **
 4:   ** int
 5:   ** lock_perform_deadlock_search (SEMAWAIT *semawait,
 6:   **     LOCKREC *lockrec)
 7:   ** Perform deadlock search by calling lock___check_deadlock. If
 8:   ** the deadlock search finds a victim cleanup the victim. If the
 9:   ** victim is us then release the lockrec also.
10:   **
11:   ** Parameters:
12:   ** semawait : the semawait which is causing the wait leading to
13:   **          deadlock search
14:   ** lockrec : lock request which is causing the wait leading to
15:   **          deadlock search
16:   **
17:   ** Returns:
18:   ** LOCK_DEADLOCK - if the current task is the deadlock victim
19:   **          0 - otherwise
20:   **
21:   ** Side Effects:
22:   ** Current tasks lock sleep task entry might be moved to the
23:   ** tail of the lock sleep task queue.
24:   ** Note that as part of deadlock victim cleanup, victims lock
25:   ** sleep task entry could be deleted from the lock sleep task
```

```
 26:    ** queue. The lockrec would be released if the current task
 27:    ** is the deadlock victim (all this would be done by
 28:    ** lock_cleanup_deadlock_victim called by this routine)
 29:    **
 30:    ** Called by:
 31:    ** lock___semawait( )
 32:    **
 33:    ** MP synchronization:
 34:    ** LOCK_SLEEPTASK_SPIN is held when moving the current tasks
 35:    ** lock sleep task entry to the tail.
 36:    **
 37:    */
 38:    SYB_STATIC int
 39:    lock_perform_deadlock_search (SEMAWAIT *semawait,
 40:            LOCKREC *lockrec)
 41:    {
 42:        LOCALPSS(pss);      /* initialize local copy of global pss */
 43:
 44:        /* place holder for call to deadlock search */
 45:        LOCKSLEEPOWNER waiter_data;
 46:        /* deadlock table holding multiple chains. */
 47:        DLTAB   deadlock_tab;
 48:
 49:        PSS     *victim;    /* deadlock victim */
 50:
 51:        /* Record spid visited in   */
 52:        spid_t  dlcurrent_path[SEMA_MAX_RECURSION];
 53:                    /* deadlock search recursion*/
 54:        circ_long lockwait_seqno;
 55:
 56:    #if !WORK_GP_PRIM
 57:        MONEVENT_LOCK_DEADLOCK_BEGIN( );
 58:        MONITOR_INC(mc_lock(deadlock_search));
 59:    #endif /* WORK_GP_PRIM */
 60:
 61:        /*
 62:        ** Set up the waiting task data for the first call
 63:        ** to deadlock search.
 64:        */
 65:        waiter_data.lsosemawait = semawait;
 66:        waiter_data.lsospinlock = semawait—>swspinlock;
 67:        waiter_data.lsospid = pss—>pspid;
 68:
 69:        /*
 70:        ** Clear the bitmap indicating visited spids before starting
 71:        ** the deadlock search.
 72:        ** The number of bits in the scanarray is 1 + MAXSPID because
 73:        ** spid's range from 1 to MAXSPID. We are wasting zeroth bit.
 74:        */
 75:        MEMZERO(Resource—>rdlc_scanarray, BYTESLEN(MAXSPID+1));
 76:
 77:        /* Initialize key info in the deadlock table. */
 78:        deadlock_tab.dltxcess_recur = FALSE;
 79:        deadlock_tab.dltcycle_count = 0;
 80:
 81:        /*
 82:        ** Check for deadlocks involving ourselves
 83:        ** Note that Resource—>rdlc_sleepownerlist has enough space to
 84:        ** record two times configured number of pss. This would be
 85:        ** enough because we break only two cycles so we would end up
 86:        ** recording the same task at most twice. If we increase the
 87:        ** number of cycles detected by this algorithm then we should
 88:        ** increase the size of Resource—>rdlc_s1eepownerlist.
 89:        */
 90:        lock_check_deadlock(&waiter_data, FIRST_DEADLOCK_CALL,
 91:                &deadlock_tab, (LOCKSLEEPOWNER *)
 92:                Resource—>rdlc_sleepownerlist, dlcurrent_path);
 93:        /*
 94:        ** If we generate more than one deadlock, victimize the
 95:        ** initiator.
 96:        */
 97:        if (deadlock_tab.dltcycle_count > 1)
 98:        {
 99:    #if !WORK_GP_PRIM
100:        MONITOR_INC(mc_lock(lock_multipledeadlock));
101:    #endif /* WORK_GP_PRIM */
102:
103:        if (pss—>pstat & P_BACKOUT)
104:        {
105:            /*
```

```
106:            ** If the initiator was a backout task and it was involved
107:            ** in more than one cycle then lock__check_deadlock would
108:            ** have stored an alternate victim in the second deadlock
109:            ** chain. Use that as the victim instead of the initiator.
110:            */
111:            victim = deadlock_tab.dltchains[1] .dlcvictim_pss;
112:         }
113:         else
114:         {
115:            victim = pss;
116:         }
117:      }
118:      else
119:      {
120:         victim = deadlock_tab.dltchains[0] .dlcvictim_pss;
121:      }
122:
123:      if (victim != pss)
124:      {
125:         /*
126:         ** Move our sleep task entry from head to
127:         ** tail because our deadlock search is over and we
128:         ** are not the victim.
129:         */
130:         P_SPINLOCK(LOCK_SLEEPTASK_SPIN);
131:         lockwait_seqno = CIRCLE_NEXT(Resource—>rdlc_lockwait_seqno);
132:         LOCK__MOVE_TO_TAIL(pss—>plocksleepq_entry, lockwait_seqno);
133:         V_SPINLOCK(LOCK_SLEEPTASK_SPIN);
134:      }
135:
136:      /* Cleanup the victim if our search found a deadlock victim */
137:      if (victim)
138:      {
139: #if !WORK_GP_PRIM
140:         MONITOR_INC(mc_lock(deadlocks));
141: #endif /* WORK_GP_PRIM */
142:
143:         /*
144:         ** There is a deadlock victim!
145:         */
146:         Resource—>rdeadlock_id++;
147:
148:         /* Cleanup victim */
149:         (void) lock_cleanup_deadlock_victim(victim,
150:                  &deadlock_tab, lockrec);
151:      }
152:
153:      /*
154:      ** Wake up the next person in the sleep task queue to
155:      ** continue the search if necessary.
156:      */
157:      P_SPINLOCK(LOCK_SLEEPTASK_SPIN);
158:      lock__check_timeout(LOCK_CONTINUE_STQSCAN);
159:
160: #if !WORK_GP_PRIM
161:      MONEVENT_LOCK_DEADLOCK_END(0);
162: #endif /* WORK_GP_PRIM */
163:      /*
164:      ** If we are the victim, there is nothing more to do
165:      ** except to return with DEADLOCK status.
166:      */
167:      if (victim == pss)
168:         return LOCK_DEADLOCK;
169:      else
170:         return 0;
171: }
```

The function largely serves as a wrapper, performing certain initialization and housekeeping chores, before invoking the "real" deadlock workhorse routine, lock_check_deadlock (at line 90). The call to lock_check_deadlock returns status information, via deadlock_tab. If multiple deadlocks are detected (tested at line 97), the function victimizes the initiator at line 111.

If the current task is not the victim (tested at line 123), then the sleep task entry or record is moved from head to tail, as the deadlock search has completed and the current task is not the victim. At lines 136–151, the function performs cleanup of any victim found in the deadlock search. Specifically, this is done by a call to a cleanup subroutine, at line 149. In the event that the current task is the victim, the function returns LOCK_DEADLOCK, at line 168. Otherwise, it returns a result value of zero.

3. lock_check_deadlock

Actual deadlock checking is performed by the lock_check_deadlock function. In an exemplary embodiment, the function may be constructed as follows.

```
 1: /*
 2: ** LOCK_CHECK_DEADLOCK
 3: **
 4: ** void
 5: ** lock_check_deadlock(LOCKSLEEPOWNER *waiter_dlcheck_data,
 6: **         int level; short *dlindex, DLTAB * deadlock_tab,
 7: **         LOCKSLEEPOWNER *sleepowner_1ist,
 8: **         spid_t dlcurrent_path[ ])
 9: **
10: ** See if sleeping on a semawait would cause deadlocks.
11: ** The search algorithm detects deadlocks by detecting cycles in
12: ** a directed dependency graph amongst tasks waiting for locks.
13: ** In this graph there would be a directed edge from task A to
14: ** task B if task A was waiting for a lock that task B owns. The
15: ** dependency graph is not explicitly created. The algorithm
16: ** actually represents only the nodes in the graph in a list
17: ** called sleeping owners list. The edges are implicitly
18: ** represented through recursion.
19: **
20: ** The algorithm accepts the spid of a waiting task and the lock
21: ** semawait it is waiting on as input (in waiter_dlcheck_data).
22: ** It first creates a list of owners of this lock which are
23: ** themselves sleeping for other locks (by calling
24: ** lock_set_sleeping_owners_list) . Then the algorithm is
25: ** repeated recursively on each of the sleeping owners until
26: ** either the list is empty or the search has exceeded
27: ** SEMA_MAX_RECURSION levels of recursion.
28: ** The recursion at any level stops when either the list is
29: ** empty or if one of the sleeping owners is the initiator
30: ** itself. In the latter case we have detected a deadlock and a
31: ** victim is selected to break the deadlock.
32: **
33: ** The algorithm only detects deadlocks involving the task which
34: ** initiated the search. It detects upto two cycles involving
35: ** the initiator. The search is stopped after detecting two
36: ** cycles to contain the cost of search.
37: **
38: ** This routine does not acquire any spinlocks since:
39: **
40: **    1. The spinlocks are needed only when we traverse the
41: **       lock hash chains or the lock sleep task queue to
42: **       record sleeping owners. A11 this is done in
43: **       lock_set_sleepingowner_list.
44: **    2. The algorithm allows the lock manager data structures
45: **       to change while deadlock search is in progress.
46: **    3. Only one task is allowed to perform deadlock search at
47: **       any time;
48: ** One interesting fallout of this observation is that this
49: ** task can yield now if it has almost exhausted its time
50: ** quantum.
51: ** We can detect a tree of deadlock chains; for instance 1.2.3
52: ** and 1.2.4 are two deadlock chains which have the first two
53: ** dlcitem's in common. We record the entire first deadlock
54: ** information (1.2.3) in the 1st DLCHAIN and the entire second
55: ** deadlock in the 2nd DLCHAIN. This algorithm could support
56: ** more than 2 DLCHAINs, if later we decide to kill a list of
57: ** victims instead of the caller.
58: **
59: ** We will resolve only deadlock chains starting at level 0. The
60: ** algorithm would detect deadlocks starting at other levels but
61: ** would not try to break the deadlocks. This is done to limit
62: **
63: ** the cost of deadlock search. Note that the dlcinfo structure
64: ** in each dltchain is filled up as soon as the deadlock is
65: ** detected (lock_fill_dltab( ) is called once to fill in the
66: ** information.
67: **
68: ** Parameters:
69: ** waiter_dlcheck_data : Information recorded for the waiter by
70: ** the caller.
71: ** level           : Level of recursion (used to prevent excessive
72: **                   recursion
73: ** dlindex         : Index into deadlock chain structures off of
74: **                   deadlock_tab.
75: ** deadlock_tab    : table holding deadlock information about
76: **                   possible
77: **                   multiple deadlock chains
78: ** sleepowner_list : Pointer to record the lock sleep owner
79: **                   list at this level.
80: ** dlcurrent_path  : Array of spids involved in this cycle in
```

```
 81: **                     the order they were visited.
 82: **
 83: ** Returns:
 84: ** Nothing.
 85: **
 86: ** Side Effects:
 87: ** dlindex           - contains the number of deadlocks found, if it
 88: **                     contains 0, there is no deadlock dectected.
 89: ** deadlock_tab      - contains the list of victim pss.
 90: **
 91: ** Fields affected in deadlock_tab:
 92: ** - dltchains (mapped to deadlock_chain)
 93: **                     are used to track deadlock info for each
 94: **                     deadlock.
 95: ** - dltxcess_recur   may get set if we exceed the max
 96: **                     recursion level
 97: **
 98: ** Fields affected in each deadlock_chain
 99: ** - dlcvictim_pss    is used to communicate the detection of a
100: **                     deadlock in lock_check_deadlock()
101: **                     If we are recursing in
102: **                     lock_check_deadlock( ), this value may
103: **                     not be the final victim.
104: ** - dlclast_item     is incremented for each collection of
105: **                     deadlock info
106: **                     in the different levels of recursion in
107: **                     lock_check_deadlock( ).
108: **
109: ** Called by:
110: ** lock semawait( ), lock_check_deadlock ( )
111: **
112: ** MP synchronization:
113: ** None!
114: **
115: */
116: SYB_STATIC void
117: lock_check_deadlock(LOCKSLEEPOWNER *waiter_dlcheck_data,
118:             int level,
119:             DLTAB * deadlock_tab,
120:             LOCKSLEEPOWNER *sleepowner_list,
121:             spid_t dlcurrent_path[ ])
122: {
123:   LOCALPSS (pss) ;      /* initialize local copy of global Pss */
124:   REGISTER PSS      *ownerpss;
125:   PSS       *victimpss;   /* Pss ptr of victim found in search */
126:   DLCHAIN     *deadlock_chain;/* local ptr to a deadlock_chain. */
127:   int32      ownerpid;
128:   LOCKSLEEPOWNER    *newsleepowner_list;
129:   int       noofsleepers;
130:   int       i;
131:   REGISTER PSS      *tmp_pss;
132:   CFG_VALUE      cfgprtdlockinfo;
133:
134: /*
135: ** Check for stack overflow in this recursive routine.
136: ** This must appear directly after the declaration section
137: ** in the routine.
138: */
139:   CHECKSTACKOFLOW;
140:
141: /*
142: ** At each level check the timeslice and yield if need to!
143: ** The state information is available in lock sleep owner list and
144: ** we allow the lock manager state to change after recording
145: ** the waiter data.
146: */
147:   if ( pss—>ptimeslice < 0)
148:   {
149:      (void) upyield( );
150:   }
151:
152:   (void) cfg_getconfig(CFG_PRTDEADLOCKINFO, CFG_RUNVALUE,
153:             &cfgprtdlockinfo)
154:
155:   /* set the deadlock chain pointer, and the index on dlcitem's within
156:   ** that chain
157:   */
158:   deadlock_chain =
& (deadlock_tab—>dltchains [deadlock_tab—>dltcycle_count]);
159:   deadlock_chain—>dlcvictim_pss = 0;
```

```
160:
161:     /*
162:     ** Terminate recursion if excessive. Nominate current process as the
163:     ** victim if this level is reached.
164:     */
165:     if (level == SEMA_MAX_RECURSION)
166:     {
167:       /*
168:       ** Set deadlock_tab—>dltxcess_recur to true so we can
169:       ** terminate the search for a victim.
170:       ** Lock_print_deadlockchain( ) uses this info to identify
171:       ** phony deadlocks. Don't copy any info for this level.
172:       */
173:       deadlock_tab—>dltxcess_recur = TRUE;
174:       deadlock_tab—>dltcycle_count++;
175:
176:       /* victimize pss of requestor. */
177:       deadlock_chain—>dlcvictim_pss = pss;
178:       /*
179:       ** If initiator is a backout task then select the
180:       ** first non BACKOUT task in the path.
181:       ** If there is no non BACKOUT task then Tough Luck!!
182:       ** In this case we have to choose the initiator as the
183:       ** victim.
184:       */
185:       if (pss—>pstat & P_BACKOUT)
186:       {
187:         for(i=0; i<= level; i++)
188:         {
189:         tmp_pss = GET_UNKEPT_PSS(dlcurrent_path[i]);
190:         if (! (tmp_pss—>pstat & P_BACKOUT))
191:           {
192:             deadlock_chain—>dlcvictim_pss = tmp_pss;
193:             break;
194:           }
195:         }
196:       }
197:     return;
198:   }
199:
200:   /* Store the waiters spid in the current path array. */
201:   dlcurrent_path[level] = waiter_dlcheck_data—>lsospid;
202:   /*
203:   ** Create the sleeping owners list.
204:   ** lock_set_sleepingowner_list returns the number of sleeping
205:   ** owners that it recorded. Advance the sleeping owner list
206:   ** pointer by these many entries to pass to the next level.
207:   */
208:   noofsleepers
209:     = lock_set_sleepingowner list(waiter_dlcheck_data,
210:         sleepowner_list);
211:   newsleepowner_list = sleepowner_list + noofsleepers;
212:
213:   /*
214:   ** Recurse for each sleeping owner.
215:   */
216:   for *(; (ownerpid = sleepowner_list—>lsospid)
217:     != ENDOFLSOLIST ; sleepowner_list++)
218:   {
219:     /* Grab the sleeping owner pss */
220:     ownerpss = GET_UNKEPT_PSS(ownerpid);
221:     /*
222:     ** As a last check before recursing see if this task is no
223:     ** longer sleeping. If it is not then we do not need to
224:     ** recurse on this entry. This is done without holding the
225:     ** bucket spinlock.
226:     */
227:     if (ownerpss—>pwaitsema == o)
228:     {
229:       continue;
230:     }
231:
232:     /* We have a cycle if we encounter our own pss again */
233:     if (ownerpss == pss)
234:     {
235:
236: # ifdef TRACE_LOCK
237:       if ( (TRACECMDLINE(LOCKM, 4)) ||
238:           cfgprtdlockinfo.int32_value)
```

```
239:        {
240:          /* Fill all the information about this chain. */
241:          lock_fill_dltab(deadlock_chain, dlcurrent_path,
242:                  level, ownerpid);
243:        }
244: # endif /* TRACE_LOCK */
245:
246:     /*
247:     ** We found a new deadlock increment the cycle_count.
248:     */
249:     deadlock_tab—>dltcycle_count++;
250:
251:     /* stop looping if we've reached the limits of detection */
252:     if (deadlock_tab—>dltcycle_count >= MAX_VICTIMS)
253:     {
254:        /* Choose the initiator as the victim */
255:        deadlock chain—>dlcvictim_pss = pss;
256:        /*
257:        ** If initiator is a backout task then select the
258:        ** first non BACKOUT task in the path. There has to be a
259:        ** non BACKOUT task in the cycle because:
260:        **   1. known access method assumptions imply that we can
261:        **      not have a cycle involving just backout tasks.
262:        **   2. multiple cycle requires a shared lock and BACKOUT
263:        **      tasks acquire only address locks. So there has to
264:        **      be a non BACKOUT task in this case.
265:        */
266:        if (pss—>pstat & P_BACKOUT)
267:        {
268:          for(i= 0; i<= level; i++)
269:          {
270:            tmp_pss = GET_UNKEPT_PSS(dlcurrent_path[i]);
271:            if (! (tmp_pss—>pstat & P_BACKOUT))
272:            {
273:               deadlock_chain—>dlcvictim_pss = tmp_pss;
274:               break;
275:            }
276:          }
277:        }
278:        return;
279:     }
280:     /*
281:     ** We found a new deadlock. Select a deadlock victim for
282:     ** this chain.
283:     */
284:     lock_select_deadlock_victim(deadlock_chain,
285:               dlcurrent_path,
286:               level)
287:
288:     /*
289:     ** Clear the visited bit for all the tasks involved in this
290:     ** cycle so that we can catch other cycles involving the
291:     ** same tasks.
292:     */
293:     for (i=0; i<= level; i++)
294:     {
295:        CLEAR_BIT (Resource—>rdlc_scanarray,dlcurrent_path[i]);
296:     }
297:     /*
298:     ** Clear the visited bit of the remaining tasks in the
299:     ** sleeping owner list for this level. Leaving their bits
300:     ** on would prevent them from being recorded at other
301:     ** levels. Since we have not visited these tasks yet, they
302:     ** might be part of deadlocks involving the initiator.
303:     ** Clearing the bits ensures that they would be recorded
304:     ** and visited if encountered at other levels.
305:     */
306:     for (sleepowner_list++;
307:          (ownerpid = sleepowner_list—>lsospid) !=ENDOFLSOLIST;
308:          sleepowner_list++)
309:     {
310:        CLEAR_BIT(Resource—>rdlc_scanarray,ownerpid);
311:     }
312:     /*
313:     ** We can move return to previous level of recursion since
314:     ** all deadlocks involving tasks below this level on this
315:     ** path can be broken by selecting any one of the tasks in
316:     ** dlcurrent_path as the victim. This is because all such
317:     ** deadlocks would have to involve all the tasks in
318:     ** dlcurrent_path also. Since we have already chosen one of
```

```
319:  ** these tasks as a potential victim there
320:  ** is no sense is searching for further deadlocks on this
321:  ** path.
322:  */
323:  return;
324:  }
325:
326: /* Recurse with the current sleeping owner. */
327: lock_check_deadlock(sleepowner_list, level + 1,
328:           deadlock_tab,
329:           newsleepowner_list, dlcurrent_path);
330: victimpss = deadlock_chain—>dlcvictim_pss;
331:
332: if (victimpss)
333: {
334:
335:   ** We have a victim. Continue to loop for other
336:   ** deadlock candidates. The tail of this deadlock
337:   ** chain has been already filled up, set up the
338:   ** new chain for the next iterations.
339:   */
340:   if ( deadlock tab—>dltcycle_count < MAX_VICTIMS)
341:   {
342:     deadlock_chain
343:       = &(deadlock_tab—>dltchains
344:            [deadlock_tab—>dltcycle_count]);
345:     deadlock chain—>dlcvictim_pss = 0;
346:   }
347: }
348:
349:   /* stop looping if we've reached the limits of detection */
350:   if (deadlock_tab—>dltcycle_count >= MAX_VICTIMS)
351:      return;
352: }
353:   return;
354: }
```

The function operates by performing a depth-first search of a tree of dependencies among tasks waiting for locks. The tree or graph would have a "directed edge" from task A to task B if task A is waiting for a lock that task B owns. The dependency graph is not explicitly created but is, instead, represented by recursion which occurs in the function (at lines 326–329). For instance, if task B is waiting on task A, then the function will invoke itself recursively for the task which task A is waiting on. In order to prevent stack overflow, the depth of recursion cannot exceed a maximum number of levels (here, SEMA_MAX_RECURSION number of levels). The recursion at a particular level stops when the function detects that one of the sleeping tasks is itself the initiator of a deadlock. Here, a deadlock is detected and a victim is selected to break the deadlock. As shown, the currently preferred embodiment does not employ any spin locks and, thus, avoids "freezing" the system while deadlock search is being performed.

The specific steps of the function are as follows. First, at lines 134–139, the function checks for stack overflow, since this is a recursive routine. At line 147, the function checks its time slice, for determining whether it needs to yield. At line 165, the function tests whether the current level has reached the maximum number of recursions (i.e., equal to SEMA_MAX_RECURSION). Here, an excess recursion flag is set to "true," at line 173, and a deadlock count is incremented, at line 174. Next, at lines 176–177, the requester is victimized. However, if a task is a "backout" task, a special case, then it is not victimized. Instead, the first non-backout task in the path is selected, as shown at lines 178–196. Here, the "backout" task is one which is backing out of a transaction. In order to leave the system in a consistent state, therefore, a backout task is preferably not victimized (unless there are no non-backout tasks). Finally, the "if" statement initiated at line 165 (i.e., for the case of maximum recursion) is concluded by a "return" statement, at line 197.

Ordinarily, maximum recursion has not been reached and the function proceeds to lines 200–201 to record the current path in a path array (i.e., from task A to task B to task C, and so forth and so on). The path is recorded by storing the task ID (spid) in the path array. At lines 202–211, the function creates the previously-described "sleeping owners list"— that is, the owners currently sleeping on the lock. At line 216, a "for" loop is established for examining each sleeping owner. At line 227, the function makes a last check for seeing whether the task is still sleeping. If the task is no longer sleeping, then it does not need to recurse on this entry in the sleeping owners list. In such a case, it executes the "continue" statement, at line 229.

At line 223, the function tests whether a cycle exists—that is, the sleeping owner is encountered again. In such a case, the function has found a new deadlock and, thus, increments a deadlock cycle count, at line 249. After a maximum number of search cycles has been reached (tested at line 252), the function stops looping and proceeds to choose the initiator as the victim, at line 255. However, as before, if the initiator is a "backout" task, the function instead selects the first non-backout task in the path, as shown at lines 256–277. For such a case, the method returns at line 278.

If the cycle count does not reach the limit, the function proceeds to lines 280–286, to select a deadlock victim for the current chain, by calling lock_select_deadlock_victim. This is followed by clearing a "visited" bit for all tasks involved in the cycle (so that other cycles involving the same tasks can be caught). The "if" statement initiated at line 252 concludes with a "return" statement at line 323.

Otherwise (i.e., maximum cycle count has not been reached), the function or method proceeds to lines 326–329, for invoking itself recursively with the current sleeping owner. Upon returning from the recursion, the function tests whether a "victim" exists, at line 332. If one or more victims exist, the victim information is added to the deadlock chain. As the function is still at this point executing within the "for" loop established at line 216, the function will continue to loop for other deadlock candidates. In the event that the cycle count has reached a maximum limit, the function returns at line 351. Otherwise, the "for" loop loops through remaining sleeping owners. At the conclusion of the "for" loop, the function returns, at line 353.

CONCLUSION

While the invention is described in some detail with specific reference to a single preferred embodiment and certain alternatives, there is no intent to limit the invention to that particular embodiment or those specific alternatives. For example, while locks and many data structures associated with locks have been described as accessible through hash tables, those skilled in the art, enabled by the teachings of the present invention, will appreciate that other efficient-indexing access mechanisms may be employed. Further, although the discussion of the preferred embodiment focuses on exclusive and non-exclusive locks, those skilled in the art will appreciate that the teachings of the present invention may be applied to other types of locks (e.g., "intent" locks), such as the varying degrees of lock exclusivity and granularity commonly provided by database systems. In such a case, compatibility between locks can be determined by providing a lock compatibility table. Thus, the true scope of the present invention is not limited to any one of the foregoing exemplary embodiments but is instead defined by the appended claims.

What is claimed is:

1. In a multi-tasking database system having a server storing a database connected to a plurality of clients, said database system providing a plurality of database engines for processing requests from the clients for database operations, an improved method for providing access to objects provided by the database system, the method comprising:

providing each database engine with a lock manager for controlling access to objects in the database system;

storing lock management data structures which can be shared among all database engines, said lock management data structures storing locking information about a first plurality of locks that comprise a plurality of lock types for protecting access to objects in the database system which are shared;

controlling access to said lock management data structures through at least one hash table comprising a plurality of hash buckets, each hash bucket being associated with a particular lock type from said plurality of lock types provided by the system;

protecting access to said lock management data structures themselves with a second plurality of locks that comprise spin locks; and providing parallel access to different ones of said first plurality of locks provided by the database system by associating each spin lock from said second plurality of locks with a particular group of hash buckets.

2. The method of claim 1, wherein each database engine operates on a separate processor of a symmetric multi-processor computer system.

3. The method of claim 1, wherein said lock manager controls access to a particular object by granting a lock to that particular object, the lock being selected from said first plurality of locks.

4. The method of claim 3, wherein objects which can be locked by said first plurality of locks include database tables, database pages, and memory buffers.

5. The method of claim 3, wherein each lock granted from said first plurality of locks can be either an exclusive lock or a shared lock.

6. The method of claim 1, wherein each hash bucket maintains a queue of lock requests for a particular object.

7. The method of claim 6, wherein said queue has a head and a tail, and wherein the immediate lock request appearing at the head of the queue represents a lock from said first plurality of locks which is currently granted.

8. The method of claim 6, wherein locks from said first plurality of locks which can coexist share equivalent positions in the queue.

9. The method of claim 8, wherein locks from said first plurality of locks which can coexist include shared locks.

10. The method of claim 1, further comprising:

receiving a request from a task for access to a particular hash bucket; and in response to said request, asserting the spin lock associated with the hash bucket and providing the task access to locking information maintained at the particular hash bucket.

11. The method of claim 10, further comprising:

receiving a second request from another task for access to another hash bucket, said another hash bucket being associated with another spin lock; and in response to said second request, asserting said another spin lock and providing said another task access to said another hash bucket, while at the same time continuing to provide access to said particular hash bucket which was first requested.

12. The method of claim 1, further comprising:

receiving a request for access to a particular object;

in response to said request, examining the hash bucket associated with the particular object for determining whether a lock from said first plurality of locks exists to protect the object;

if a lock does not already exist to protect the object, creating a lock object storing locking information about the particular object and linking that lock object onto the hash bucket; and posting a lock request for access to the particular object by appending the lock request to the lock object if no other lock requests exist for the particular object, or appending the lock request to the end of the last lock request which has been previously appended.

13. The method of claim 12, further comprising:

if the lock request being appended has no other lock request which preceeds it, immediately granting a lock from said first plurality of locks for protecting the particular object.

14. The method of claim 12, wherein the lock request is appended to another pre-existing lock request with which it can coexist.

15. The method of claim 1, further comprising:

if a lock from said first plurality of locks is needed for a particular object by a task but such a lock is not currently available, placing the task to sleep while it waits for the lock to become available.

16. The method of claim 15, further comprising:

after a pre-selected amount of time, awakening the sleeping task for initiating a deadlock search among tasks which are sleeping on locks.

17. The method of claim 16, wherein said pre-selected amount of time is sufficiently long so that at least some of the tasks sleeping on locks will be granted locks from said first plurality of locks before being awakened for initiating deadlock searching.

18. The method of claim 16, wherein tasks which have been sleeping on locks the longest are awakened first for deadlock searching.

19. The method of claim 16, wherein deadlock searching includes examining locking information for another task which holds the lock the task performing the deadlock search is currently waiting on.

20. The method of claim 19, further comprising:

reverting to a single spin lock from said second plurality of locks for protecting lock management data structures when only one database engine is active in the system.

21. In a multi-tasking database system, in which tasks may deadlock on one another while waiting for locks for accessing objects to be granted, said locks being created from a plurality of transactional lock types available in the system for protecting objects having shared access, an improved method of deadlock detection, the method comprising:

upon receiving a request from a certain task for a particular lock which can not yet be granted from said locks, placing the certain task to sleep while waiting for the particular lock to be granted;

setting an alarm for periodically determining which task has been sleeping the longest on a lock;

if the particular lock can be granted from said locks, awakening said certain task for continuing execution with access to the object controlled by the particular lock; and if the alarm triggers before the certain task has been granted the particular lock, awakening the certain task for undertaking deadlock detection.

22. The method of claim 21, wherein said placing a task to sleep step includes performing a context switch of the system so that the task does not consume processor cycles of the system while the task is sleeping.

23. The method of claim 21, wherein said alarm comprises an alarm handler which increments a counter for each sleeping task, so that a task which has been sleeping the longest can be readily determined.

24. The method of claim 21, wherein said system includes a user-configurable delay setting for indicating how often said alarm should periodically trigger.

25. The method of claim 24, wherein said delay setting is set equal to about 100 milliseconds.

26. The method of claim 24, wherein said delay setting is set equal to 0 for indicating that deadlock detection should occur immediately upon a task waiting on a lock.

27. The method of claim 24, wherein said delay setting is optimized to a particular user application which runs on the system, so that overhead incurred for deadlock detection is minimized.

28. The method of claim 21, wherein deadlock detection comprises:

constructing a directed dependency graph for representing dependencies among tasks which are sleeping.

29. The method of claim 28, further comprising:

detecting a deadlock upon finding a cycle in said directed dependency graph, said cycle representing a dependency of a particular task which cycles through other tasks back to the particular task.

30. The method of claim 29, further comprising:

upon detecting a deadlock which is initiated by said certain task, waking the deadlock by victimizing said certain task.

* * * * *